United States Patent
Pertsel et al.

(10) Patent No.: US 11,427,195 B1
(45) Date of Patent: Aug. 30, 2022

(54) AUTOMATIC COLLISION DETECTION, WARNING, AVOIDANCE AND PREVENTION IN PARKED CARS

(71) Applicant: Ambarella International LP, Santa Clara, CA (US)

(72) Inventors: Shimon Pertsel, Mountain View, CA (US); Greg Hedman, San Jose, CA (US)

(73) Assignee: Ambarella International LP, Santa Clara, CA (US)

(*) Notice: Subject to any disclaimer, the term of this patent is extended or adjusted under 35 U.S.C. 154(b) by 205 days.

(21) Appl. No.: 16/784,916

(22) Filed: Feb. 7, 2020

(51) Int. Cl.
| | |
|---|---|
| *B60W 30/095* | (2012.01) |
| *B60W 30/09* | (2012.01) |
| *B60R 1/00* | (2022.01) |
| *B60L 58/12* | (2019.01) |
| *B60L 50/60* | (2019.01) |
| *B60W 50/14* | (2020.01) |

(52) U.S. Cl.
CPC ......... *B60W 30/0956* (2013.01); *B60L 50/60* (2019.02); *B60L 58/12* (2019.02); *B60R 1/00* (2013.01); *B60W 30/09* (2013.01); *B60W 50/14* (2013.01); *B60W 2050/143* (2013.01)

(58) Field of Classification Search
CPC .. B60W 30/0956; B60W 30/09; B60W 50/14; B60W 2050/143; B60L 50/60; B60L 58/12; B60R 1/00
See application file for complete search history.

(56) References Cited

U.S. PATENT DOCUMENTS

| | | | |
|---|---|---|---|
| 9,725,087 B2* | 8/2017 | Fürst | B60W 30/09 |
| 10,424,204 B1* | 9/2019 | Han | G01S 17/02 |
| 10,994,727 B1* | 5/2021 | Kumar | G08G 1/162 |
| 2009/0076702 A1* | 3/2009 | Arbitmann | B60W 10/20 |
| | | | 701/1 |
| 2015/0039218 A1* | 2/2015 | Bowers | B60W 30/0956 |
| | | | 701/301 |
| 2015/0175072 A1* | 6/2015 | Sabeti | B60Q 9/008 |
| | | | 348/148 |
| 2015/0294166 A1* | 10/2015 | Kuehnle | B60T 7/22 |
| | | | 382/104 |
| 2016/0121884 A1* | 5/2016 | Ciotlos | B60R 21/0134 |
| | | | 701/1 |
| 2017/0089720 A1* | 3/2017 | Zhang | G06Q 10/02 |
| 2017/0096167 A1* | 4/2017 | Yoon | G08G 1/143 |
| 2017/0178352 A1* | 6/2017 | Harmsen | G06V 10/42 |
| 2019/0364248 A1* | 11/2019 | Katayama | G01C 21/3623 |
| 2021/0133500 A1* | 5/2021 | Faller | G06K 9/6256 |

* cited by examiner

*Primary Examiner* — Jelani A Smith
*Assistant Examiner* — Frank T Glenn, III
(74) *Attorney, Agent, or Firm* — Christopher P. Maiorana, PC

(57) ABSTRACT

An apparatus includes a capture device and a processor. The capture device may be configured to generate pixel data corresponding to an exterior view from a vehicle. The processor may be configured to perform operations on video frames generated from the pixel data to detect a moving object in the video frames, determine a predicted path of the moving object, determine a probability of the moving object colliding with the vehicle based on the predicted path, determine whether the vehicle is stationary and generate a control signal if the vehicle is stationary and the probability is greater than a pre-determined threshold. The control signal may be configured to enable a response to alert a person in control of the moving object.

18 Claims, 14 Drawing Sheets

AUTOMATIC COLLISION DETECTION, WARNING, AVOIDANCE AND PREVENTION IN PARKED CARS

FIELD OF THE INVENTION

The invention relates to computer vision generally and, more particularly, to a method and/or apparatus for implementing automatic collision detection, warning, avoidance and prevention in parked cars.

BACKGROUND

Parking lots are often poorly designed, have tight spaces, have bad sight lines, and do not have clear rules. Large vehicles (i.e., trucks, vans, SUVs, etc.) block sight lines of a driver in parking lots. As a result, a significant amount of parking accidents occur in parking lots. Often, the accidents happen when one of the cars is unoccupied and parked. The vehicle that gets hit is helpless. The owner of the vehicle that is hit does not even witness the damage until after the collision occurs.

With the spread of electric vehicles, parked vehicles have access to a large battery (i.e., usually 50-100 kWh battery). Electric vehicles do not need to have an engine on and running to perform accessory functions. One such accessory is video surveillance utilizing built-in car cameras. Some vehicles are capable of notifying the vehicle owner of a detected event and record video of the incident. However, informing a vehicle owner of a detected event after the fact does little to help a damaged vehicle.

It would be desirable to implement automatic collision detection, warning, avoidance and prevention in parked cars.

SUMMARY

The invention concerns an apparatus comprising a capture device and a processor. The capture device may be configured to generate pixel data corresponding to an exterior view from a vehicle. The processor may be configured to perform operations on video frames generated from the pixel data to detect a moving object in the video frames, determine a predicted path of the moving object, determine a probability of the moving object colliding with the vehicle based on the predicted path, determine whether the vehicle is stationary and generate a control signal if the vehicle is stationary and the probability is greater than a pre-determined threshold. The control signal may be configured to enable a response to alert a person in control of the moving object.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
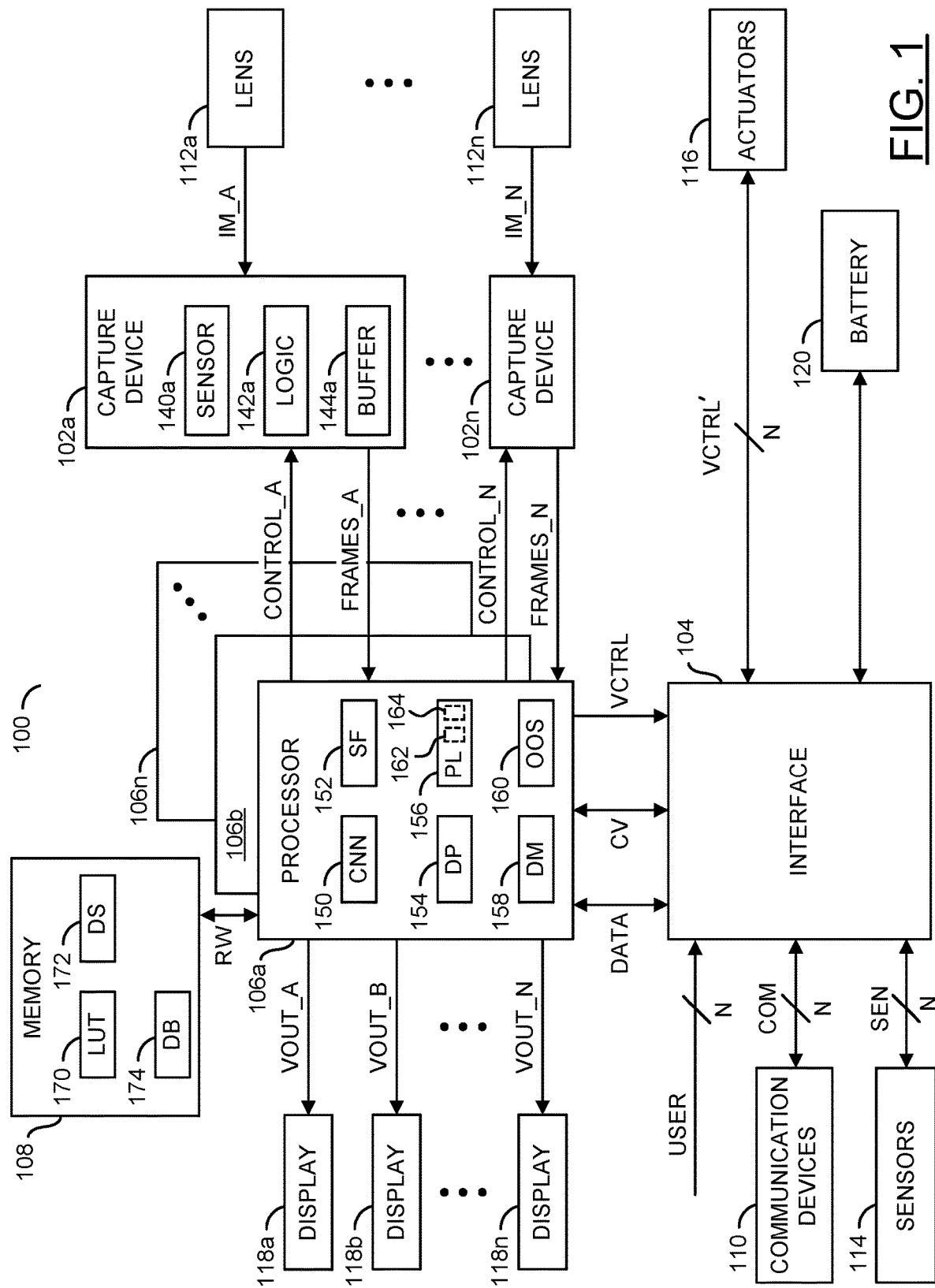
FIG. 1 is a diagram illustrating an embodiment of the present invention.

Embodiments of the present invention include providing automatic collision detection, warning, avoidance and prevention in parked cars that may (i) operate when a vehicle is unmanned, (ii) inform other drivers of potential collisions, (iii) predict a path of a vehicle, (iv) automatically adjust a position of a vehicle in a parking spot, (v) determine an amount of available space to adjust a location of a vehicle, (vi) disable functionality when battery availability is below a threshold, (vii) predict a trajectory of a door of an adjacent vehicle, (viii) stream video to another vehicle and/or (ix) be implemented as one or more integrated circuits.

Embodiments of the present invention may be configured to monitor the movements of a moving object (e.g., another vehicle). For example, if the invention is implemented in a vehicle (e.g., an ego vehicle), computer vision may be used to monitor the movements of another car. A predicted path of the moving object may be monitored to determine whether the moving object may collide with the ego vehicle. A response may be generated if a potential collision (e.g., potential event) is detected based on the predicted path of the moving object. The computer vision operations and/or the response may be performed when the ego vehicle is not moving and/or unmanned. For example, the computer vision operations and/or the response may be performed when the ego vehicle is parked (and unattended) in a parking lot. In another example, the computer vision operations and/or the response may be performed when the ego vehicle is standing idle (e.g., a driver is waiting at a stop light).

Embodiments of the present invention may select a response to the moving object based on the predicted path and/or available space near the ego vehicle. In one example, the response to the potential collision may be to generate an audio collision warning. The audio collision warning may comprise honking a horn, playing an audio recording (e.g., "Stop!") and/or providing corrective instructions (e.g., "Stop, pull back and move to the left), etc. In another example, the response to the potential collision may be collision avoidance. The collision avoidance may comprise determining an amount of nearby space and slightly adjusting the position of the ego vehicle (e.g., re-adjusting how the ego vehicle is parked in a parking space based on how close adjacent cars are parked) to give more space to the moving object (e.g., move 10 inches forward or backward).

Similarly, embodiments, of the present invention may detect other vehicles that are not moving, but may pose a potential threat to the ego vehicle. For example, in parking lots dings are common because people carelessly swing a car door open. For example, the computer vision operations may be configured to detect car doors, determine a potential trajectory of the car door and perform a response after determining whether the potential trajectory of the car door poses a threat. For example, if another car is parked too close to the ego vehicle, the response may be to reposition the ego vehicle to avoid door dings.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n. In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model. The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment.

The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
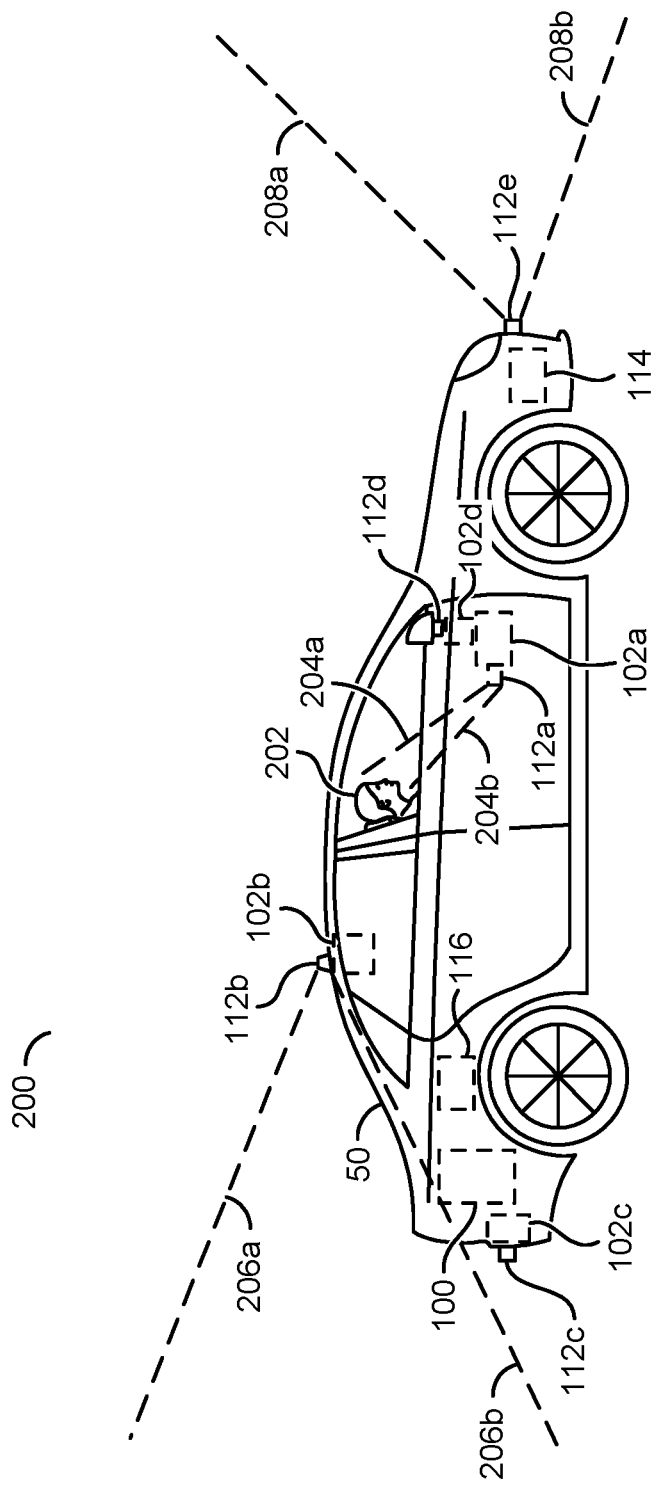
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation. A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc.

Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices

102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
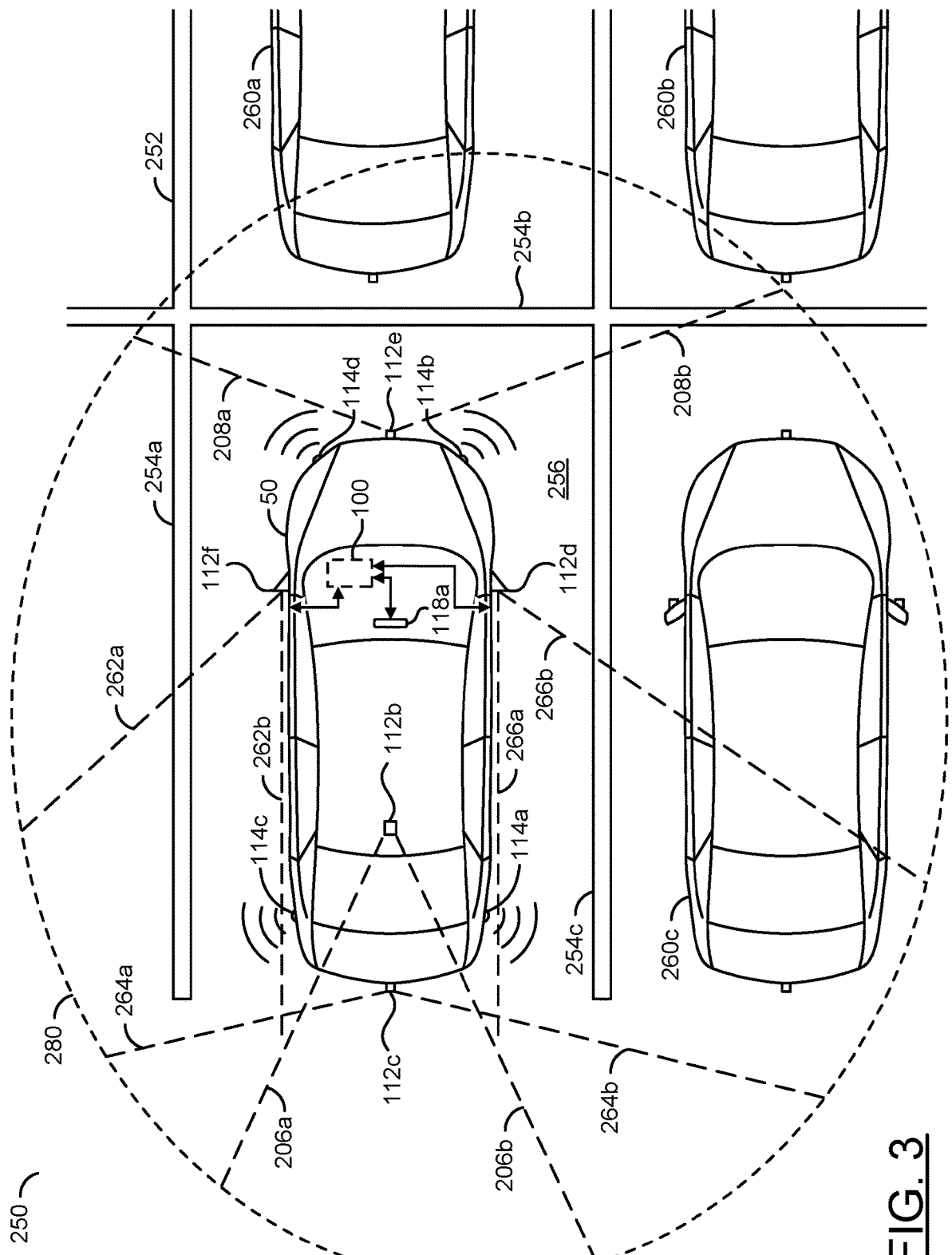
FIG. 3 is a diagram illustrating a 360 degree field of view captured by a parked vehicle.

Referring to FIG. 3, a diagram illustrating a 360 degree field of view captured by a parked vehicle is shown. An overhead view 250 of the ego vehicle 50 in a parking lot is shown. The apparatus 100 is shown within the ego vehicle 50. The lenses 112a-112f are shown on the ego vehicle 50. The sensors 114a-114d are shown located on the outside of the ego vehicle 50. The display 118a is shown within the ego vehicle 50. While only one of the displays 118a is shown as a representative example, generally the ego vehicle 50 may comprise more than one of the displays 118a-118n.

Parking lines 252 are shown. The parking lines 252 may be part of a parking lot. A parking line 254a is shown on a driver side of the ego vehicle 50, a parking line 254b is shown in front of the ego vehicle 50 and a parking lines 254c is shown on a passenger side of the ego vehicle 50. The parking line 254a-254c may form a parking spot 256. The ego vehicle 50 may be parked in the parking spot 256. For example, the ego vehicle 50 may be unattended (e.g., the driver 202 is no longer present and/or the ego vehicle 50 is empty).

Vehicles 260a-260c are shown near the ego vehicle 50. The vehicles 260a-260c are shown within the parking lines 252. Each of the vehicles 260a-260c are shown parked near the ego vehicle 50. The vehicles 260a-260c may be objects that may be detected by the computer vision operations performed by the processors 106a-106n. For example, the computer vision operations performed by the processors 106a-106n may be configured to detect the vehicles 260a-260c, determine a location of the vehicles 260a-260c with respect to the ego vehicle 50 (e.g., distance, direction, relative speed, etc.), determine a make/model of the vehicles 260a-260c, read a license plate of the vehicles 260a-260c, etc. The vehicles 260a-260c may be detected by the computer vision operations if the vehicles 260a-260c are moving (e.g., in traffic) or if the vehicles 260a-260c are stationary (e.g., parked, as shown). The type of information detected by the processors 106a-106n about the vehicles 260a-260c may be varied according to the design criteria of a particular implementation.

Each of the lenses 112a-112f may be directed to capture a different field of view. As shown in association with FIG. 2, the lens 112b may capture the field of view 206a-206b and the lens 112e may capture the field of view 208a-208b. Dotted lines 262a-262b are shown. The dotted lines 262a-262b may represent the field of view captured by the lens 112f (shown directed towards a rear of the ego vehicle 50 from the driver side mirror location). Dotted lines 264a-264b are shown. The lines 264a-264b may represent the field of view captured by the lens 112c (shown directed behind the ego vehicle 50 from the rear bumper location). Dotted lines 266a-266b are shown. The lines 266a-266b may represent the field of view captured by the lens 112d (shown directed towards a rear of the ego vehicle 50 from the passenger side mirror location). In an example, each of the fields of view captured by the lenses 112a-112f may be presented as video data to the displays 118a-118n and/or analyzed by the processors 106a-106n. The lenses 112a-112f and the corresponding fields of view (e.g., the fields of view 206a-206b, 208a-208b, 262a-262b, 264a-264b and 266a-266b) are shown as an illustrative example. More lenses (e.g., the lenses 112a-112n) and/or fields of view may be captured by the apparatus 100.

A dotted circle 280 is shown. The dotted circle 280 may represent an exterior field of view from the perspective of the ego vehicle 50 captured by the apparatus 100. The processors 106a-106n may be configured to combine the video data captured by the capture devices 102a-102n to form the exterior field of view 280. The exterior field of view 280 may be a 360 degree field of view (e.g., a field of view that captures video data in all or most directions around the ego vehicle 50, a field of view that surrounds the ego vehicle 50, etc.). The lenses 112a-112f and the corresponding fields of view (e.g., the fields of view 206a-206b, 208a-208b, 262a-262b, 264a-264b and 266a-266b) and/or data from other lenses (e.g., the lenses 112g-112n, not shown) may be combined to enable the processors 106a-106n to have access to video data over the full 360 degree field of view 280.

In some embodiments, the processors 106a-106n may be configured to perform video stitching operations and/or de-warping operations to form the 360 degree field of view 280. In some embodiments, the processors 106a-106n may be configured to analyze the video data captured by each of the capture devices 102a-102n and aggregate the results to make inferences about all the video data in the 360 degree field of view 280 (e.g., the video data from each field of view may be analyzed individually, and the results may be combined to effectively create the 360 degree field of view 280, even if a single video stream of all 360 degrees around the ego vehicle 50 is never actually created).

While a generally circular shape for the 360 degree field of view 280 is shown, the particular shape of the 360 degree field of view may not be circular. For example, the range of each of the capture devices 102a-102n may be different. In another example, the physical location of the capture devices 102a-102n on the ego vehicle 50 may determine how far from the ego vehicle 50 the field of view 280 is able to reach. The 360 degree field of view may have an irregular shape. The circular shape of the 360 degree field of view 280 is shown for illustrative purposes. For example, the range of the 360 field of view 280 may extend farther from the ego vehicle 50 than shown.

The processors 106a-106n may be further configured to perform computer vision operations on the video data captured in the 360 degree field of view 280 (which may provide an approximation of what the driver 202 would be able to see if the driver 202 was in the ego vehicle 50) and more. For example, the computer vision operations performed by the processors 106a-106n may be configured to detect the parked vehicles 260a-260c and/or the parking space 256. The sensor fusion module 152 may be configured to combine the detection of the vehicles 260a-260c from analyzing the video data captured with a detection of objects using the proximity sensors 114a-114d (e.g., radar, lidar, etc.). The sensor fusion module 152 may be further configured to weight the information received from the computer vision operations (e.g., modify coefficients to represent how likely the detections made by the computer vision operations are correct based on the detections made by the proximity sensors 114a-114d). For example, the sensor fusion module 152 may be configured to weight the information provided by each sensor (e.g., a confidence level of the computer vision detection, a confidence level of the detection of the sensors 114a-114d, the distance limitations of the sensors 114a-114d, whether the computer vision detects the vehicle 260c at a distance beyond the range of the sensors 114a-114b, etc.).

The processors 106a-106n may be configured to detect events. In some embodiments, the event may be information that warrants being brought to the attention of the driver 202. In some embodiments, the event may be information about the nearby vehicles 260a-260c. In some embodiments, the event may be a detected scenario that the apparatus 100 should react to (e.g., avoid collisions, provide warnings, store information, etc.). For example, whether a detected scenario is considered an event may be determined by the decision module 158. In one example, the event may correspond to detecting that one of the vehicles 260a-260c may be on a collision course with the ego vehicle 50. The events may be detected based on the computer vision operations performed on the video data captured using the lenses 112a-112n. The events may be detected based on readings from the sensors 114a-114n. For example, the sensor fusion module 152 may be configured to combine information determined using the computer vision operations and information detected using the sensors 114a-114n to make inferences that may be used by the decision module 158.

In one example, the mere presence of the vehicles 260a-260c may not be enough to be considered an event. However, when one or more of the vehicles 260a-260n is too close to the ego vehicle 50 and/or is on a collision course with the ego vehicle 50 (e.g., a crash is imminent without corrective actions), then one or more of the vehicles 260a-260n may be considered an event. In the example shown, the vehicles 260a-260c may be parked and stationary and considered to be far away from the boundaries of the parking space 256 and unlikely to collide with the ego vehicle 50 (e.g., non-events). In some embodiments, the mere presence of a detected object may considered an event. For example, if the vehicle 260c was parked too close to the ego vehicle 50, then the detected object may be the car door of the vehicle 260c and the presence of the detected door may be an event (e.g., when the door opens, there is a potential collision hazard with the ego vehicle 50 that may be considered an event). The processors 106a-106n determining that there is potential for some type of hazard (e.g., a collision) may be considered an event before the hazard actually occurs.

The processors 106a-106n may generate the signal VCTRL in response to detecting an event. When no event is detected, the processors 106a-106n may not generate the signal VCTRL. The processors 106a-106n may be configured to generate a notification as a response to the detected (or predicted) event. In one example, the notification may be communicated by the communication devices 110 to the driver 202 along with an annotated video stream. For example, when the decision module 158 determines that an event has been detected the processors 106a-106n may generate the notification as part of (or alongside) one or more of the signals VOUT_A-VOUT_N.

The ego vehicle 50 may implement the apparatus 100 that enables computer vision and 360 degree cameras to provide the exterior field of view 280 and the additional sensors 114a-114n (e.g., such as parking ultrasonics and radars). The apparatus 100 may enable an automatic solution to respond to the detected event that may not require the driver 202 to be present in the ego vehicle 50. Since much of the damage to vehicles that occurs in parking lots happen when the driver 202 is not present, the apparatus 100 may be configured to reduce damage to the ego vehicle 50 that the driver 202 would not be able to prevent if not in the ego vehicle 50.

In some embodiments, the response generated by the processors 106a-106n to the detected event may be a collision warning. For example, every new electric vehicle may be equipped with the speaker 116 (e.g., for low-speed EV "noise-making" regulations). The capture devices 102a-102n may enable the apparatus 100 to monitor the surroundings of the ego vehicle 50 to detect if there is a potential danger (e.g., a potential event). The response may provide a preventative measure to prevent and/or mitigate accidents and/or collisions. The collision warning may warn a driver of one or more of the other vehicles 260a-260c if the apparatus 100 detects that the other driver is about to hit the ego vehicle 50 (e.g., backing into the ego vehicle 50 when trying to park).

Figure 4:
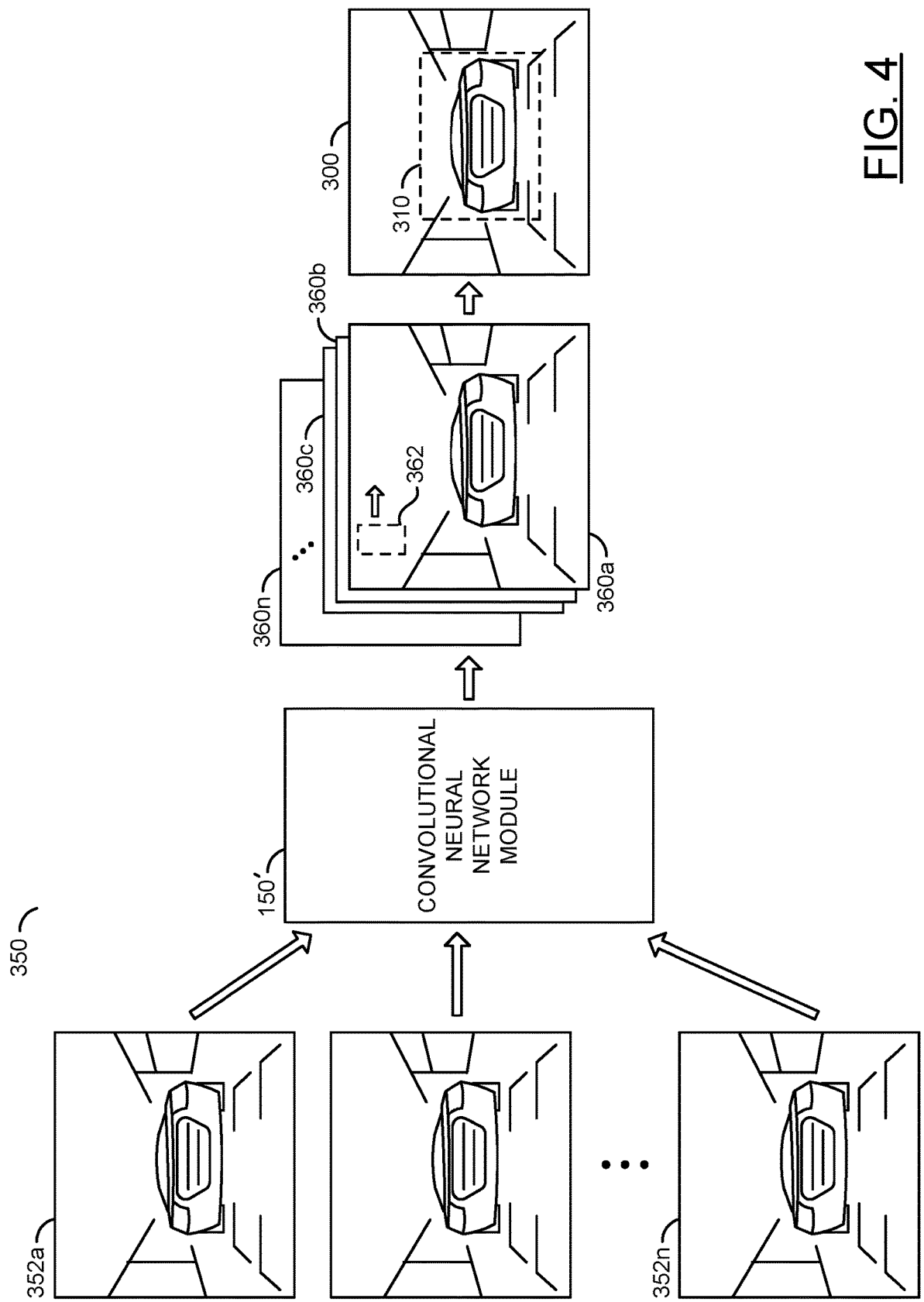
FIG. 4 is a diagram illustrating an example visualization of training a convolutional neural network for object detection using fleet learning.

Referring to FIG. 4, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture video data of a predicted collision (e.g., captured from a backup camera of the ego vehicle 50). For example, the training data 352a-352n may be a sequence of video frames of scenarios when the processors 106a-106n determined that a potential collision may or may not occur. The training data 352a-352n may be labeled based on whether the prediction was incorrect or correct. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps)

of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100. The CNN module 150' may continue to receive the training data 352a-352n from each apparatus 100, refine the machine learning model, and then provide updates to the machine learning model for each apparatus 100. The centralized CNN module 150' may develop and/or refine the machine learning model by receiving input (e.g., the training data 352a-352n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106a-106n), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352a-352n would be kept local. Whether the machine learning is performed locally (e.g., at the edge), performed using a centralized resource and/or performed using a combination of local and centralized resources may be varied according to the design criteria of a particular implementation.

Figure 5:
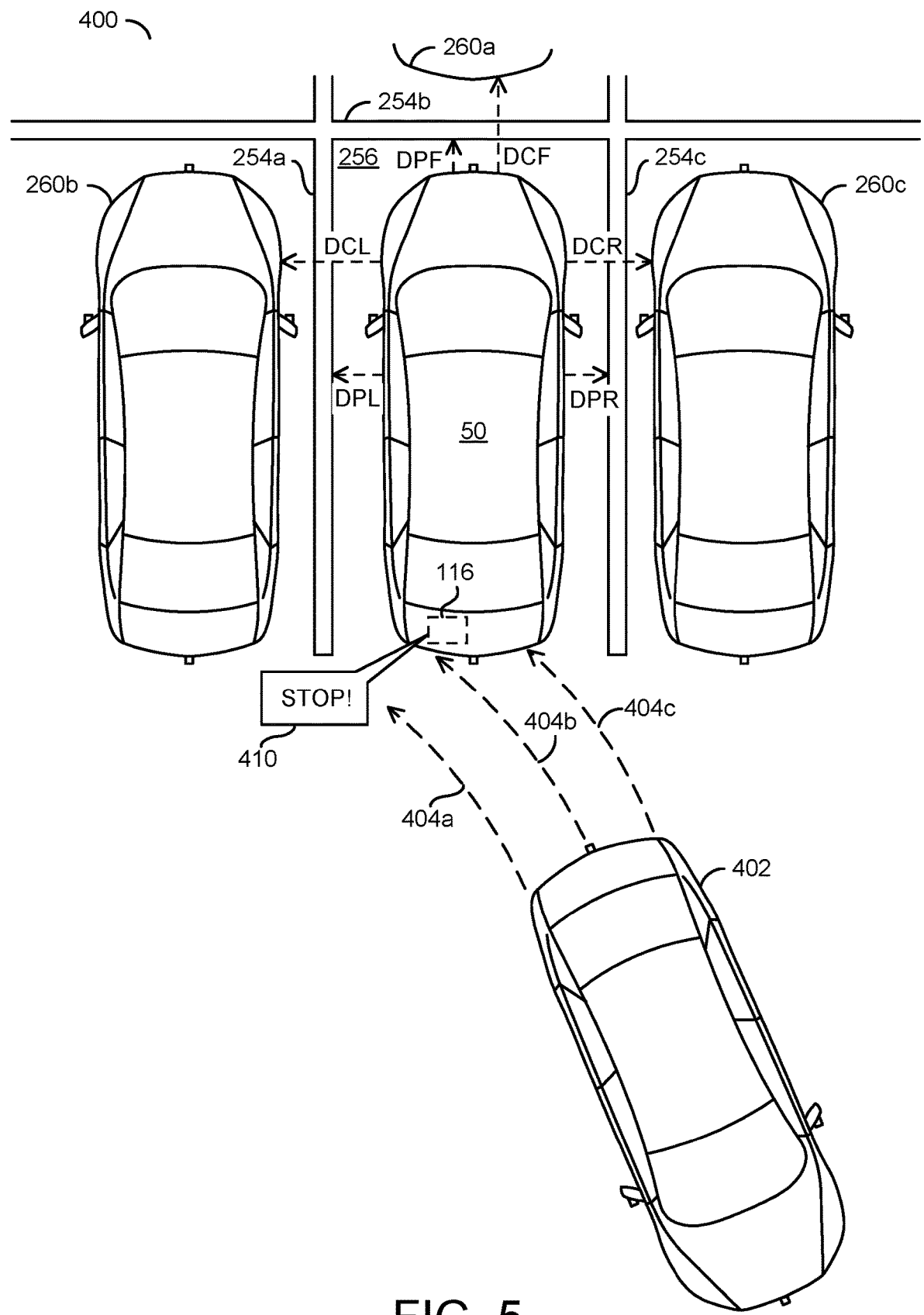
FIG. 5 is a diagram illustrating an example response to detecting a predicted path of a vehicle.

Referring to FIG. 5, a diagram illustrating an example response to detecting a predicted path of a vehicle is shown. An example scenario 400 is shown. The example scenario 400 may be another example of a parking lot. The ego vehicle 50 is shown in the parking spot 256 bounded by the parking lines 254a-254c. The vehicle 260a is shown parked in front of the ego vehicle 50. The vehicle 260b is shown parked to the left of the ego vehicle 50. The vehicle 260c is shown parked to the right of the ego vehicle 50. Each of the vehicles 260a-260c may be adjacent to the ego vehicle 50.

In the example scenario 400, each of the ego vehicle 50 and the vehicles 260a-260c are shown generally parked centered in the respective parking spots (e.g., not parked too close to the lines). The ego vehicle 50 and each of the vehicles 260a-260c may be stationary vehicles (e.g., parked in the parking lot). The ego vehicle 50 and each of the vehicles 260a-260c may each be unmanned (e.g., no driver present). However, the example scenario 400 shown may be equally applicable if the driver 202 is present in the ego vehicle 50.

A moving object 402 is shown. The moving object 402 may be a vehicle in motion. For example, the moving object 402 may be a vehicle attempting to pull into a parking spot (not shown), or pulling out of a parking spot. While the moving object 402 is a vehicle in the example shown, other types of moving objects may be detected, tracked and/or analyzed (e.g., bikes, motorcycles, scooters, wheelchairs, baby strollers, shopping carts, etc.).

The processors 106a-106n may be configured to perform computer vision operations on the video data captured of the 360 degree field of view 280. The processors 106a-106n may be configured to detect the stationary objects (e.g., the vehicles 260a-260c and/or the parking lines 254a-254c) in the video frames. The processors 106a-106n may be configured to detect the moving object 402 in the video frames. The computer vision operations performed by the processors 106a-106n may be configured to determine a predicted path (e.g., extrapolate a trajectory) of the moving object 402 by analyzing video frames over time.

Dotted lines 404a-404c are shown. The dotted lines 404a-404c may represent the predicted path of the moving object 402 determined by the processors 106a-106n. The computer vision operations performed by the processors 106a-106n may analyze a sequence of the video frames. The computer vision operations may track a movement of the moving object 402 over time in the sequence of video frames. Based on the previous movements of the moving object 402 and/or the current position of the moving object 402, the processors 106a-106n may determine the predicted path 404a-404c. The processors 106a-106n may further take into account factors such as the size of the moving object 402, the speed of the moving object 402, an angle of the wheels of the moving object 402 (if visible), the movement of the steering wheel by the driver of the moving object 402 (if visible), an orientation of the moving object 402, etc. to determine the predicted path 404a-404c. In the example shown, the processors 106a-106n may track the movements of the single moving object 402. However, the processors 106a-106n may be configured to track and/or predict the movements of any number of moving objects (e.g., the moving objects 402a-402n) simultaneously.

The processors 106a-106n may be configured to compare the predicted path 404a-404c to the location of the ego vehicle 50. The comparison of the predicted path 404a-404c to the location of the ego vehicle 50 may be used to determine whether the moving vehicle 402 may potentially collide with the ego vehicle 50 (e.g., a potential event). The processors 106a-106n may be configured to determine a probability of the moving object 402 colliding with the ego vehicle 50. Prior knowledge of the size of the ego vehicle 50 and/or the location of the lenses 112a-112n may be used along with the computer vision operations and data captured by the sensors 114 to determine the potential for the collision. The probability of the moving object 402 hitting the ego vehicle 50 may be compared to a threshold. The threshold may be a pre-determined value (e.g., a confidence level of the detections and/or extrapolations performed). If the probability is determined to be above the pre-determined threshold, then the processors 106a-106n may generate the signal VCTRL to enable a response. In the example shown, predicted path 404a-404c may be on a collision course with the ego vehicle 50. When the processors 106a-106n determine that the predicted path 404a-404c indicates a collision, the decision module 158 may detect that the event has occurred and generate a response.

An example response 410 is shown. The example response 410 is shown as an audio output (e.g., a speech bubble indicating the word "STOP!" was output as audio). The audio response 410 is shown as output from the external speaker 116. The audio response 410 may be generated in response to the event detected of the moving object 402 backing into the ego vehicle 50. In the example shown, the audio output 410 is a simple instruction (e.g., STOP). However, the audio output response 410 may be varied according to the design criteria of a particular implementation.

The audio response 410 may be a computer vision enabled solution to detect, prevent and avoid parking accidents. For example, federal regulations may mandate that new electric vehicles are to be equipped to be equipped with speakers to make noise when moving in low speed to alert pedestrians. The processors 106a-106n may generate the signal VCTRL utilize the speakers 116 for the alternate purpose of providing the audio response 410.

The computer vision operations performed by the processors 106a-106n may use vehicle detection and path prediction to understand if the trajectory 404a-404c of the car 402 trying to park nearby will result in the car 402 hitting the ego vehicle 50. One example response performed by the processors 106a-106n may be to warn the other driver audibly using the audio response 410. In one example, the audio response 410 may be implemented by generating the signal VCTRL to cause the ego vehicle 50 to honk the vehicle horn (e.g., activate one of the actuators 116). In another example, the audio response 410 may be implemented by generating the signal VCTRL to cause the external speaker 116 of the ego vehicle 50 to play a descriptive message (e.g., "STOP! You're about to hit the grey Tesla on your left"). In yet another example, the audio response 410 may be implemented by generating the signal VCTRL to cause the external speaker 116 of the ego vehicle 50 to play verbal instructions for avoiding the collision (e.g., "Slowly pull back, rotate the wheel right, slowly pull forward", etc.). Generally, the audio response 410 may implement behavior similar to what the driver 202 would do if sitting in the ego vehicle 50 and watching the other car 402 park (e.g., give a warning if you see that another car is about to hit you). However, since the computer vision operations may be performed without the driver 202 present, the processors 106a-106n may enable the collision avoidance to be performed when the ego vehicle 50 is not occupied by a person.

The processors 106a-106n may be configured to analyze the trajectory 404a-404c of the moving object 402 and, if the trajectory 404a-404c indicates a likely collision, then determine discrete instructions for the driver of the moving object 402 for avoiding the collision (e.g., a course correction). In the example shown, the moving object 402 may be reversing into the ego vehicle 50 by backing up and turning to the right. The processors 106a-106n may analyze the trajectory 404a-404c and determine that a collision may be likely with the rear end of the ego vehicle 50 (e.g., an event). The processors 106a-106n may generate the discrete instructions based on the trajectory 404a-404c and/or other objects detected in the video frames to provide a course correction.

For example, since the moving object 402 may be moving towards the ego vehicle 50, the first of the discrete instructions may be to stop. Continuing the example, since the moving object 402 may be backing up, the next discrete instruction may be to shift the car from reverse to a forward gear. Next, since the moving object may be too far to the right, the next discrete instruction may be to turn the wheel to the left. For example, the audio response 410 may be "Stop, shift the car to forward, and turn the wheel to the left". In some embodiments, the processors 106a-106n may wait for the moving object 402 to perform the instruction from the previous step before providing the next discrete instruction (e.g., make sure the vehicle 402 has stopped before providing the instruction to shift to a forward gear).

A line (e.g., DPL), a line (e.g., DCL), a line (e.g., DPF), a line (e.g., DCF), a line (e.g., DCR) and a line (e.g., DPR) are shown. The line DPL may represent a distance between the ego vehicle 50 and the parking line 254a to the left of the ego vehicle 50. The line DCL may represent a distance between the ego vehicle 50 and the vehicle 260b to the left of the ego vehicle 50. The line DPF may represent a distance between the ego vehicle 50 and the parking line 254b to the front of the ego vehicle 50. The line DCF may represent a distance between the ego vehicle 50 and the vehicle 260a to the front of the ego vehicle 50. The line DPR may represent a distance between the ego vehicle 50 and the parking line 254c to the right of the ego vehicle 50. The line DCR may represent a distance between the ego vehicle 50 and the vehicle 260c to the right of the ego vehicle 50. The distances DPR, DPF, DPL, DCR, DCF and/or DCL may represent an amount of available space around the ego vehicle 50.

Using the 360 degree field of view 280 captured by the capture devices 102a-102n, the processors 106a-106n may be configured to measure distances from the ego vehicle 50. For example, the processors 106a-106n may perform the computer vision operations to detect the parking line 254a and measure the distance DPL. In another example, the processors 106a-106n may perform the computer vision operations to detect the vehicle 260a and measure the distance DCF. Using the computer vision operations, the processors 106a-106n may determine the distances DPL, DCL, DPF, DCF, DPR and/or DCR (e.g., using stereo camera pairs, using time-of-flight cameras, etc.). The processors 106a-106n may also use prior knowledge of the size and/or shape of the ego vehicle 50, and/or the proximity sensors 114a-114d (e.g., radar, lidar, etc.) to determine the distances DPL, DCL, DPF, DCF, DPR and/or DCR. The processors 106a-106n may use the distances DPR, DPF, DPL, DCR, DCF and/or DCL to determine the amount of available space around the ego vehicle 50.

The processors 106a-106n may use the distance DPL, the distance DPF and the distance DPR to determine the amount of space on each side of the ego vehicle 50 that is available within the parking space 256. The processors 106a-106n may use the distance DCL, the distance DCF and the distance DCR to determine the amount of space on each side of the ego vehicle 50 that is available before colliding with one of the adjacent vehicles 260a-260c. The amount of available space may be used in order to perform a response to determining that the trajectory 404a-404c of the moving object 402 may result in an impact. For example, the response by the processors 106a-106n may be to generate the signal VCTRL to cause the ego vehicle 50 to move autonomously.

The autonomous movement of the ego vehicle 50 may be a slight adjustment to the location of the ego vehicle 50 to avoid the incoming moving object 402. In one example, based on the measured distances DPL, DPF and DPR, the signal VCTRL may be selected to cause the ego vehicle 50 to move within the bounds of the parking space 256. In another example, based on the measured distances DCL, DCF and DCR, the signal VCTRL may be selected to cause the ego vehicle 50 to move as far as possible without colliding with the adjacent vehicles 260a-260c. The processors 106a-106n may first determine whether the ego vehicle 50 may avoid the potential collision with the moving object 402 by staying within the bounds of the parking space 256 (e.g., a potentially less disruptive re-adjustment). If the processors 106a-106n determine that the ego vehicle 50 may still be hit by the moving object 402 if within the bounds of the parking space 256, then the processors 106a-106n may attempt to avoid (or reduce the impact of) the potential collision by moving the ego vehicle 50 as far as possible without hitting the vehicles 260a-260c.

In the example shown, the trajectory 404a-404c of the moving object 402 may indicate an approach to the rear of the ego vehicle 50 and that the moving object 402 may turn into the back left portion of the parking space 256. In response to detecting that the moving object 402 may collide with the ego vehicle 50 from the rear, the response may be for the processors 106a-106n to generate the signal VCTRL to move the ego vehicle forwards and/or to the right (e.g., move the car slightly to provide more room). By moving the ego vehicle 50 forwards, the moving object 402 may miss the ego vehicle 50 entirely even if the driver of the moving object 402 does not change the trajectory 404a-404c (e.g., the person in control of the moving object 402 does not pay attention to other responses such as the audio response 410). Generally, the response of moving the ego vehicle 50 autonomously may be a low speed minor avoidance maneuver, such as moving a few inches back or forward in the parking spot 256.

One or more of the capture devices 102a-102n may be implemented as a stereo pair of cameras. The processors 106a-106n may utilize the stereo pair of cameras to measure distances to objects such as the vehicles 260a-260c and/or the moving object 402. In an example, each of the capture devices 102a-102n of a stereo pair of cameras may be configured to capture images that are similar but have slightly different perspectives. Using the knowledge of the alignment and/or orientation (e.g., the distance apart, the angle between the cameras, etc.), the disparity engine 164 may be configured to compare the two images captured and determine the amount of offset between the same object captured by both cameras. The processors 106a-106n may use the amount of offset (e.g., the disparity) to determine a distance to the detected object. The processors 106a-106n may further utilize the sensor fusion module 152 to compare the image from the disparity engine 164 to the readings from the proximity sensors 114a-114d to further refine the measurement of the distance of the ego vehicle 50 to the objects detected in the captured video frames. In some embodiments, analysis of a monocular view may be used to determine distance. The method of determining the distances may be varied according to the design criteria of a particular implementation.

The processors 106a-106n may be configured to predict the trajectory 404a-404c of the moving object 402 (e.g., estimate the future position of the vehicle 402 based on previously captured video frames) and track the actual movement of the moving object 402 (e.g., detect the actual location of the vehicle 402 based on the currently captured video frames). The processors 106a-106n may be configured to compare the predicted trajectory 404a-404c and/or how the predicted trajectory 404a-404c changed over time to the actual movements of the moving object 402. The comparison may enable the processors 106a-106n and/or the centralized CNN module 150' to determine the accuracy of the predicted trajectory 404a-404c. The accuracy of the predicted trajectory 404a-404c and/or the accuracy of the probability of the collision determined by the processors 106a-106n may be used as the training data 352a-352n for the computer vision operations.

Regardless of whether the processors 106a-106n detect that the predicted path 404a-404c would not result in a collision, the processors 106a-106n may continue to perform the computer vision operations on the moving object 402. Continuing to perform the computer vision operations may enable the processors 106a-106n to determine a result of the response (e.g., whether the audio response 410 resulted in the person in control of the moving object 402 to avoid the collision). By determining whether the moving object 402 did end up colliding with the ego vehicle 50 or ended up missing the ego vehicle 50, the processors 106a-106n may compare the actual outcome (e.g., the result) with the probability of the collision determined by the processors 106a-106n. For example, negative feedback may be provided if the moving object 402 misses the ego vehicle 50 after the processors 106a-106n determine that the predicted path 404a-404c would result in a collision. In another example, negative feedback may be provided if the moving object 402 hits the ego vehicle 50 after the processors 106a-106n determine that the predicted path 404a-404c would not result in a collision. In yet another example, positive feedback may be provided when the processors 106a-106n correctly detect a collision or a non-collision.

The communication devices 110 may be configured to upload the results of the comparison (e.g., the predicted trajectory 404a-404c, the actual movements of the moving object 402, and the associated video frames) to a central server. For example, the convolutional neural network 150' implemented in a distributed computing network (shown in association with FIG. 4) may be configured to receive the results of the comparison as the training data 352a-352n. The apparatus 100 implemented by the ego vehicle 50 and other implementations of the apparatus 100 implemented by other vehicles may provide a large data set for the machine learning. Using a large data set from multiple source vehicles may provide fleet learning to continually train, refine and improve the detection of the moving objects and/or the prediction of the trajectory of the moving objects. For example, before the feature is mature, every car parked that implements the apparatus 100 may attempt to predict possible collisions. If the prediction is wrong the labeled video may be recorded and sent back to the cloud computing network 150' for training.

Figure 6:
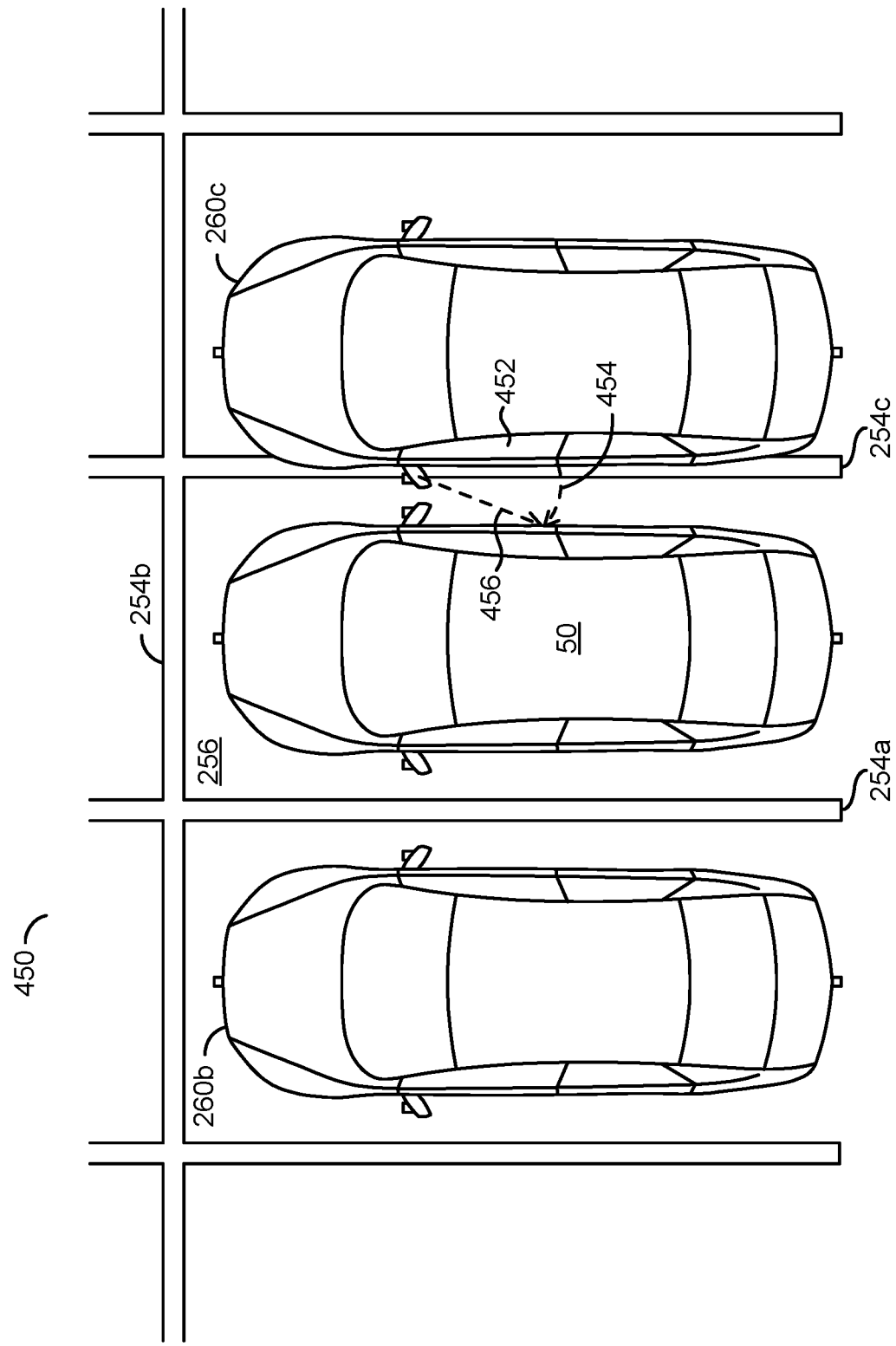
FIG. 6 is a diagram illustrating detecting a predicted path of a door of a vehicle.

Referring to FIG. 6, a diagram illustrating detecting a predicted path of a door of a vehicle is shown. An example scenario 450 is shown. The example scenario 450 may be another example of a parking lot. The ego vehicle 50 is shown in the parking spot 256 bounded by the parking lines 254a-254c. The vehicle 260b is shown parked to the left of the ego vehicle 50. The vehicle 260c is shown parked to the right of the ego vehicle 50. In the example scenario 450, the ego vehicle 50 and the vehicle 260b are shown generally parked centered in the respective parking spots (e.g., not parked too close to the lines). However, the vehicle 260c is shown parked on the parking line 254c (e.g., parked too close to the right side of the ego vehicle 50). The ego vehicle 50 and each of the vehicles 260b-260c may be stationary vehicles (e.g., parked in the parking lot). The ego vehicle 50 and each of the vehicles 260b-260c may each be unmanned (e.g., no driver present). However, the example scenario 450 shown may be equally applicable if the driver 202 is present in the ego vehicle 50.

The computer vision operations performed by the processors 106a-106n may be configured to detect and/or track moving objects (such as the moving object 402 shown in association with FIG. 5) and/or stationary objects (such as the adjacent vehicles 260b-260c). The computer vision operations may be further configured to detect and/or track sub-component of an object. The computer vision operations performed by the processors 106a-106n may be configured to determine the potential movement of the stationary object and/or the sub-component of the object. The stationary object (or sub-component) may be an object that is not moving and, if not moved, may not cause any harm to the ego vehicle 50. However, if the stationary object (or sub-component) is moved, then there may be potential harm to the ego vehicle 50. The potential for harm by the stationary object (or sub-component) may be the event detected.

A car door 452 is shown as part of the vehicle 260c. The vehicle 260c may be an object detected by the processors 106a-106n. The car door 452 may be the sub-component of the object 260c. Both the vehicle 260c and the car door 452 may be examples of stationary objects detected by the processors 106a-106n. The processors 106a-106n may be configured to predict a potential movement of the car door 452.

A potential range of motion 454 is shown. The potential range of motion 454 may represent a predicted swinging range of the car door 452. In the example shown, the example swing range 454 may range from flat against the vehicle 260c (e.g., the car door 452 in the closed position), and opened far enough to be in contact with the ego vehicle 50 (e.g., the car door 452 in an open position). A dotted line 456 is shown. The dotted line 456 may represent the position of the car door 452 when in contact with the ego vehicle 50.

The computer vision operations may detect the car door 452 on the vehicle 260c. The computer vision operations may be configured to detect the size and/or shape of the door panel of the car door 452 (e.g., length, location of the hinges, the seams of the door panel, etc.). Based on the size, shape, length and or the pivot point of the car door 452, the processors 106a-106n may determine the potential range of motion 454 and whether the car door 452 could collide with the ego vehicle 50. The processors 106a-106n may intelligently predict the open position 456 of the car door 452 to determine where on the ego vehicle 50 the car door 452 would hit. The swing range 454 and the open location 456 may be examples of determining the potential trajectory of the stationary object 452.

When the processors 106a-106n (e.g., the decision module 158) determine that there is a potential for the stationary object (or sub-component of the object) to hit the ego vehicle 50 (e.g., the event), the processors 106a-106n may generate the signal VCTRL to enable a response. The potential responses for the stationary objects may be similar to the responses used for the moving object 402. For example, the audio response 410 may be generated (e.g., honking the horn, generating audio instructions to tell the driver of the vehicle 260c to move over, indicating how much space is available, etc.). In an example, the audio response 410 may provide instructions such as guiding the driver how much room they have to open the door (e.g., "Please open the door slowly and only halfway to avoid hitting the car", "Please exit your vehicle using another door", etc.). Other types of responses may be implemented. For example, the processors 106a-106n may cause the ego vehicle 50 to re-position within the parking space 256 (as described in association with FIG. 5). In another example, the audio response 410 may be to indicate to the person exiting the vehicle 260c that they are being recorded.

While the example scenario 450 may describe cars and car doors, other types of stationary objects may be detected. In an example, in parking lots, loose shopping carts are a common hazard. The processors 106a-106n may be configured to detect people abandoning a shopping cart in the middle of the parking lot and provide the audio response 410 (e.g., "Please move the shopping cart to the designated area, you are being recorded") to the person in control of the moving object. In another example, the processors 106a-106n may ask for help from nearby pedestrians that are walking by (e.g., "There is a loose shopping cart nearby. Would you kindly move the cart to the designated area?"). The types of objects detected may be varied according to the design criteria of a particular implementation.

Figure 7:
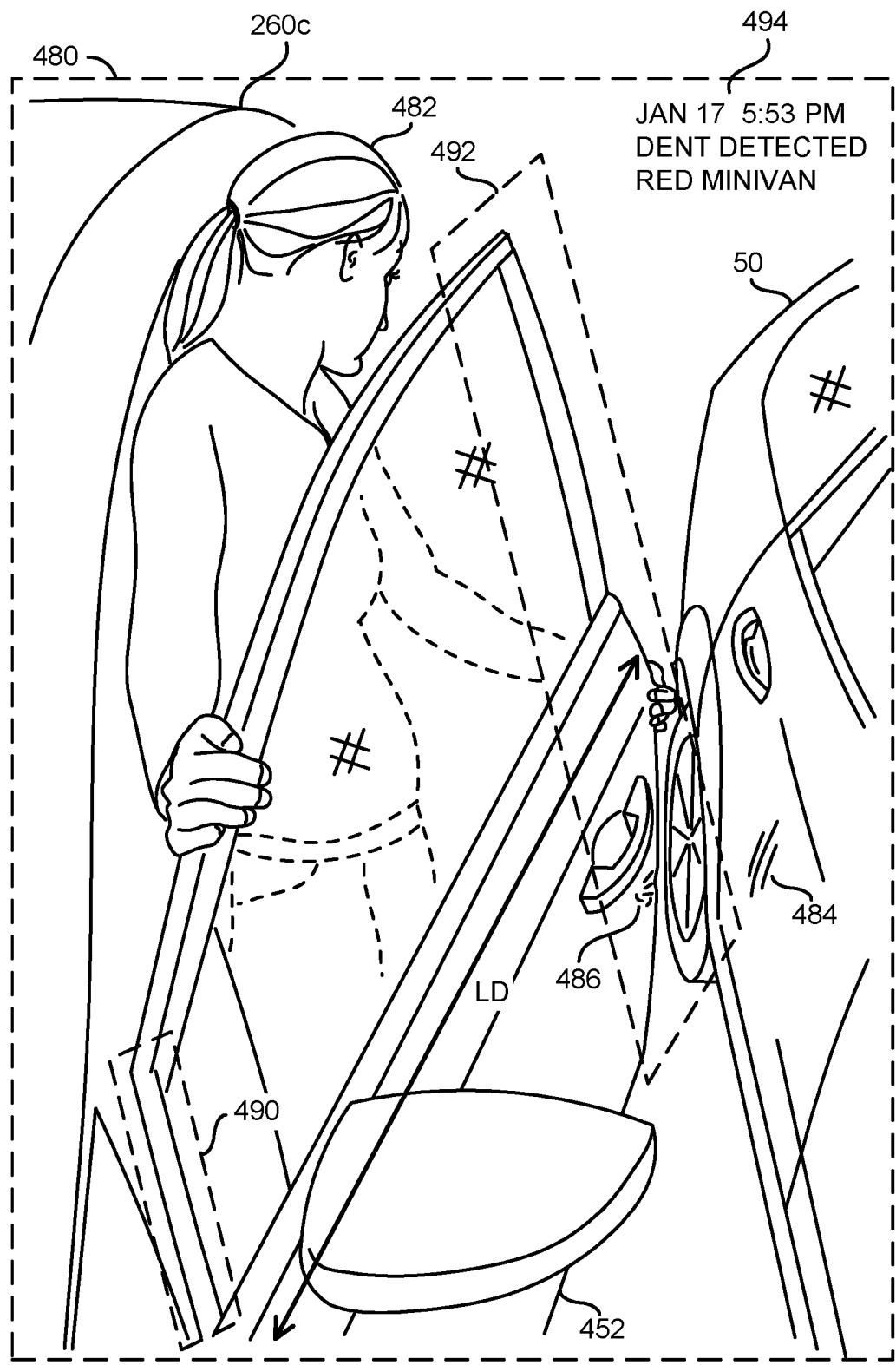
FIG. 7 is a diagram illustrating an annotated video of an incident.

Referring to FIG. 7, a diagram illustrating an annotated video of an incident is shown. An example video frame 480 is shown. The example video frame 480 may be a video frame generated by the processors 106a-106n in response to pixel data captured by the capture device 102d (e.g., from the perspective captured by the lens 112d implemented on a passenger side of the ego vehicle 50).

The example video frame 480 may comprise a partial view of the ego vehicle 50 (e.g., from a perspective directed towards the rear end of the ego vehicle 50), a partial view of the adjacent vehicle 260c, and a person 482. The person 482 may be the driver of the vehicle 260c. The driver 482 is shown between the vehicle 260c and the partially opened car door 452. Damage 484 is shown on the ego vehicle 50. The damage 484 may be a dent, a ding and/or a scratch. Markings 486 are shown on the car door 452. The markings 486 may be paint that transferred from the ego vehicle 50 to the car door 452 when the damage 484 occurred.

The example video frame 480 may show an example of detecting and/or analyzing a stationary object (e.g., the car door 452). However, similar analysis of video frames may be performed for detecting the moving object 402 and/or determining the potential trajectory 404a-404c. While one example video frame 480 is shown, the analysis (e.g., the computer vision operations) may be performed over multiple video frames (e.g., a sequence of video frames).

A dotted box 490 and a dotted box 492 are shown. The dotted box 490 and the dotted box 492 may represent detections of the computer vision operations performed by the processors 106a-106n. The dotted box 490 may correspond to the detection of the pivot point of the door 452. The dotted box 492 may correspond to the end of the door 452. A length (e.g., LD) is shown. The length LD may be measured by the processors 106a-106n by comparing the location of the pivot point 490 with the door edge 492. For example, the length LD may be used by the processors 106a-106n to determine the door swing range 454 and/or the potential door location 456 shown in association with FIG. 6.

The computer vision operations may be further configured to detect characteristics of the vehicle 260c and/or the careless driver 482. The characteristics detected may be used as evidence to show that the careless driver 482 caused the damage 484. For example, the processors 106a-106n may analyze the amount of the damage 484. In another example, the processors 106a-106n may detect the paint transfer 486 on the car door 452. In yet another example, the processors 106a-106n may detect the make, model, year, color, etc. of the vehicle 260c. In still another example, the processors 106a-106n may detect the face, and/or other identifiable characteristics of the careless driver 482 (e.g., clothing worn, height, body type, etc.). The various characteristics may be stored in the memory 108. The types of characteristics detected and/or stored may be varied according to the design criteria of a particular implementation.

Annotations 494 are shown on the video frame 480. In the example shown, the annotations 494 have been overlaid on the video frame 480. However, in some embodiments, the annotations 494 may be metadata separately stored in the memory 108 that may be associated with the video frame 480. The annotations 494 may provide evidence and/or a record of the characteristics detected that correspond to the damage 484. In the example shown, a timestamp (e.g., Jan. 17, 5:53 PM) may be part of the annotations 494. The type of event (e.g., dent detected) may be part of the annotations 494. Other types of events may be detected (e.g., potential collision with moving object avoided, collision occurred, false positive detected, etc.). In the example shown, characteristics of the vehicle 260c are shown as part of the annotations 494 (e.g., a red minivan).

The processors 106a-106n may be configured to record and/or annotate the video frames. The processors 106a-106n may be configured to select a subset of the video frames (e.g., the video frames that correspond to the event). The annotations 494 may be added to the subset of the video frames. The subset of the video frames with the annotations 494 may be stored in the memory 108. The communication devices 110 may be configured to send the video and/or the annotations to the driver 202 (e.g., a text message alert sent to a smartphone). For example, the driver 202 may be inside a store shopping and receive the annotated video frame 480 that shows the damage 484 and who caused the damage 484.

In some embodiments, the processors 106a-106n may generate the audio response 410 when the careless driver 482 begins opening the door 452. For example, the audio response 410 may be to tell the careless driver 482 to stop to prevent the damage 484 from occurring. If the damage 484 has already occurred, then the response selected by the decision module 158 may change from preventative responses to mitigation responses. In one example, the mitigation response may be to inform the careless driver 482 that they have been recorded causing the damage 484. In some embodiments, the mitigation response may be an audio message informing the careless driver 482 to leave a note with contact information. In one example, the mitigation response may be an audio message to request that the careless driver 482 hold up identification papers (e.g., documents showing a name, address and phone number) and/or insurance papers to enable the vehicle owner 202 to contact the careless driver 482 (e.g., use OCR to record the details). In some embodiments, the communication devices 110 may contact the insurance company of the careless driver 482 automatically to confirm the identity and report the incident.

Figure 8:
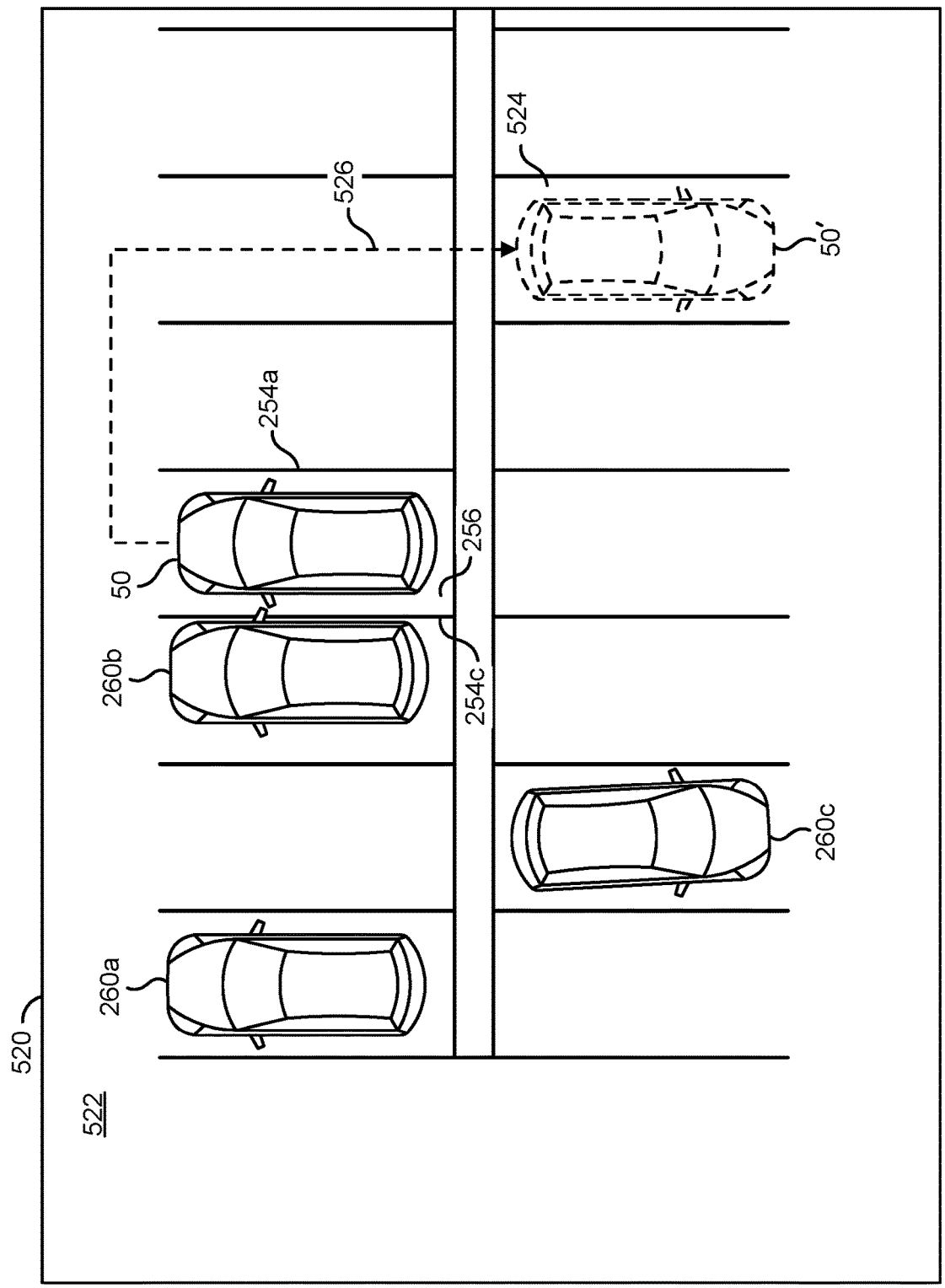
FIG. 8 is a diagram illustrating an example response of adjusting a parking spot.

Referring to FIG. 8, a diagram illustrating an example response of adjusting a parking spot is shown. An example parking lot 520 is shown. The ego vehicle 50 and the vehicles 260a-260c are shown in the parking lot 520.

The ego vehicle 50 is shown located in the parking spot 256 within the parking line 254a on the passenger side and the parking line 254c on the driver side. The ego vehicle 50 is shown generally centered within the parking spot 256 (e.g., not too close to the parking line 254a or the parking line 254c). The vehicle 260b is shown parked in a spot adjacent to the ego vehicle 50 (e.g., on the driver side of the ego vehicle 50). The vehicle 260b is shown parked too close to the parking line 254c. For example, the driver side of the vehicle 260b may have enough space to exit the vehicle 260b, but the driver side of the ego vehicle 50 may not be accessible due to the poor parking by the vehicle 260b.

Since both the ego vehicle 50 and the vehicle 260b are shown backed into the parking spots, the driver of the vehicle 260b may not notice that the vehicle 260b is parked on the parking line 254c and the vehicle 260b may obstruct the field of view of the capture devices 102a-102n (e.g., the driver of the vehicle 260b may not be visible for detection and/or may ignore the audio response 410).

To protect the ego vehicle 50 and/or to enable the driver 202 to enter the ego vehicle 50 from the driver side, the decision module 158 may select the response to re-position the ego vehicle 50. In some embodiments, the re-positioning response may comprise generating the signal VCTRL to enable re-adjusting the location of the ego vehicle 50 within the parking space 256. For example, the re-positioning response may comprise moving the ego vehicle 50 closer to the parking line 254a to provide more space between the ego vehicle 50 and the vehicle 260b. Re-positioning the ego vehicle 50 within the parking space 256 may be selected based on the measured distances DPL, DPF and DPR and/or whether there is a vehicle parked near the parking line 254a. In some embodiments, the re-positioning response may comprise moving to a different parking spot.

An empty parking spot 524 is shown. The re-positioning response may be selected by generating the signal VCTRL to cause the ego vehicle 50 to autonomously drive to the empty parking spot 524. A line 526 is shown from the current parking spot 256 of the ego vehicle 50 to the empty parking spot 524. The line 526 may represent an autonomous driving path of the ego vehicle 50 for the re-positioning response. For example, the processors 106a-106n may cause the ego vehicle 50 to autonomously drive from the parking spot 256 to the parking spot 524. A re-positioned location 50' for the ego vehicle 50 is shown in the parking spot 524.

Autonomously driving the ego vehicle 50 may be one of the responses. In the example shown, the decision module 158 may determine that the response may be to move the ego vehicle 50 from the parking spot 256 to the parking spot 524 away from the other vehicles 260a-260c. In another example, the decision module 158 may determine the response to be to autonomously reposition the ego vehicle 50 within the same parking spot 256, but farther away from the vehicle 260b.

The responses selected by the decision module 158 of the processors 106a-106n may comprise autonomously driving the ego vehicle 50 (e.g., reparking after the driver 202 has left the ego vehicle 50). The processors 106a-106n may perform the computer vision operations to determine whether there is a potential danger of door dings. Similarly, the processors 106a-106n may perform the computer vision operations to determine an inconvenience for people using the ego vehicle 50. For example, when the driver 202 (or a passenger using a rear driver side door of the ego vehicle 50) returns to the ego vehicle 50, there may be difficulty entering the ego vehicle 50 because of how close the vehicle 260b is parked (e.g., not enough room to open the doors and fit inside).

Autonomously moving the ego vehicle 50 may consume power from the battery 120. One or more features of the apparatus 100 may be disabled when the available amount of power of the battery 120 drops below a particular threshold. The threshold may be a user-defined preference and/or a manufacturer setting. In one example, the features of the apparatus 100 may be disabled when the power remaining (e.g., available charge) in the battery 120 is below 20%.

In some embodiments, responses that consume more power may be disabled before other responses. For example, autonomously moving the ego vehicle 50 from the parking spot 256 to the parking spot 524 may consume more power than providing the audio response 410 (e.g., the response of autonomously driving the ego vehicle 50 may be disabled before disabling the audio response 410). In another example, the computer vision operations performed by the processors 106a-106n while the ego vehicle 50 is parked (or idling) may be disabled when the power remaining in the battery 120 is below the threshold amount. The order of features disabled, the types of features disabled and/or the amount of the threshold of power of the battery 120 for disabling features may be varied according to the design criteria of a particular implementation.

Figure 9:
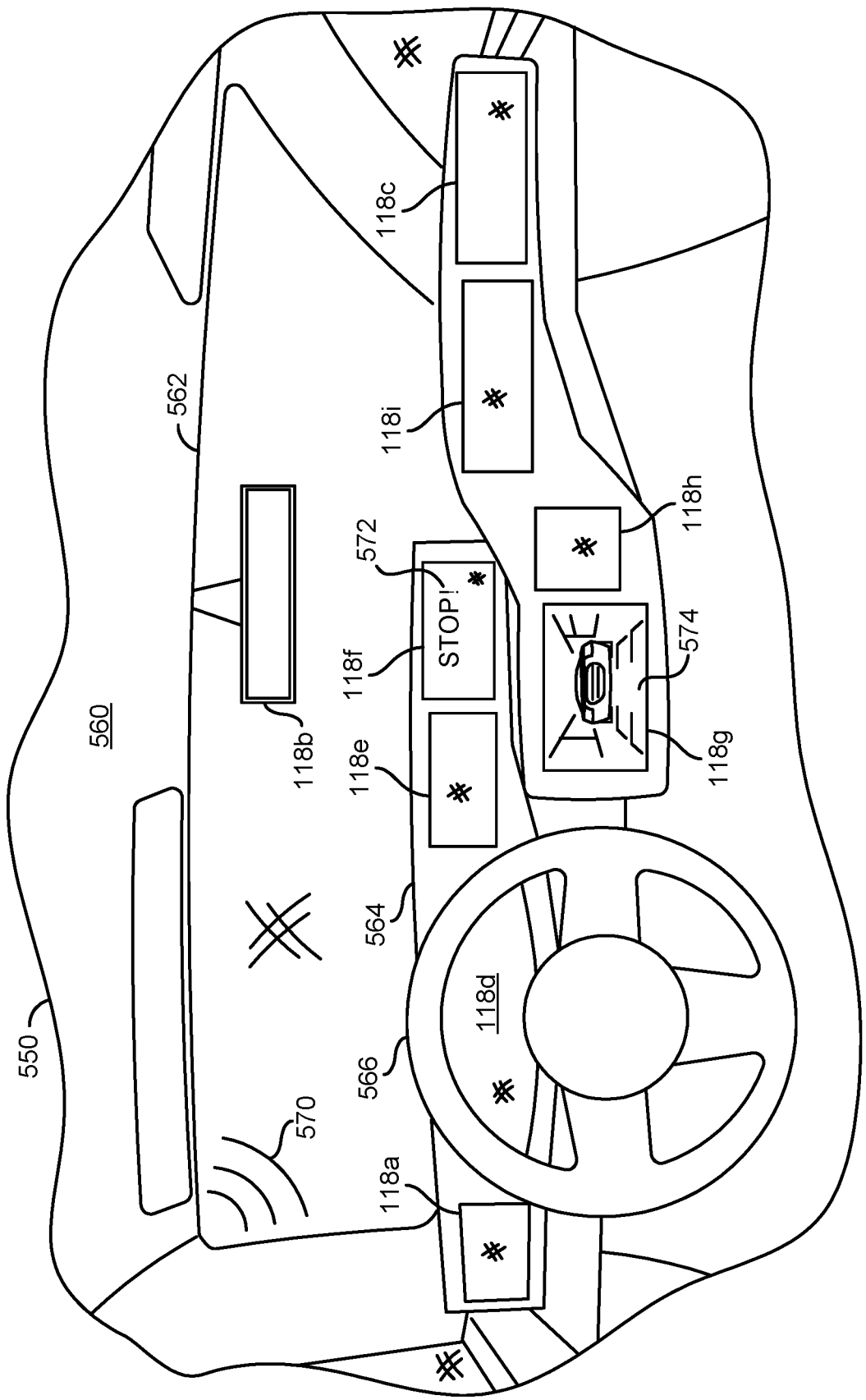
FIG. 9 is a diagram illustrating an example of streaming video to another vehicle.

Referring to FIG. 9, a diagram illustrating an example of streaming video to another vehicle is shown. An example interior view 550 is shown. The interior view 550 may show an interior 560 (e.g., a vehicle cabin). The interior 560 may be a representative example of the interior of another vehicle (e.g., the vehicle 402). For example, the other vehicle may be the moving object 402 that may have the trajectory 404a-404c that may be determined by the processors 106a-106n to be on a path to potentially collide with the ego vehicle 50.

The interior 560 of the moving object 402 may comprise a windshield 562, a dashboard 564, a steering wheel 566 and/or the displays 118a-118h. For example, the moving object 402 may comprise an implementation of the apparatus 100 that is capable of generating video output to the displays 118a-118h. Generally, the interior view 550 may comprise a view from a perspective of a driver of the moving object 402.

A wireless signal 570 is shown. The wireless signal 570 may represent a wireless communication generated by the communication devices 110 of the apparatus 100 implemented by the ego vehicle 50. The wireless signal 570 may represent a response generated by the processors 106a-106n. For example, the processors 106a-106n may generate the signal VCTRL to the interface 104, and the interface 104 may convert response to the signal COM that may be communicated by the communication devices 110 to the moving vehicle 402.

The response communicated by the wireless signal 570 may represent a video stream and/or text data. A response text output 572 is shown on the display 118f. The response text output 572 may be an example of text data communicated by the wireless signal 570. A response video output 574 is shown on the display 118g. The response video output 574 may be an example of a video stream communicated by the wireless signal 570. In some embodiments, only one of the response text output 572 or the response video output 574 may be generated. In some embodiments, the response text output 572 and the response video output 574 may be presented to the same one of the displays 118a-118n. The particular displays 118a-118n used to display the response text output 572 and/or the response video output 574 may be varied according to the design criteria of a particular implementation.

The text data for the response text output 572 may be generated by the processors 106a-106n similar to the audio for the audio response 410. In an example, the text data for the response text output 572 may be a short warning message (e.g., "STOP!"). In another example, the text data for the response text output 572 may be the set of discrete instructions (e.g., "STOP! Change the gear to forward. Turn the wheel to the right.", etc.). In some embodiments, the response text output 572 may be provided along with the audio response 410. In some embodiments, the wireless signal 570 may communicate the audio response 410 to the speakers implemented within the moving vehicle 410. The processors 106a-106n may be configured to determine the course correction (e.g., a change in the predicted path 404a-404c to avoid the potential collision), generate the steps for the discrete instructions and convert the steps into text data for the response text output 572 and/or convert the steps to audio for the audio response 410. For example, the response text output 572 may provide a visual cue in case the driver of the moving object 402 does not hear the audio response 410 (e.g., the driver is playing music loudly).

The video data for the response video output 574 may comprise video data generated by the processors 106a-106n (e.g., one or more of the signals VOUT_A-VOUT_N). The communication devices 110 may be configured to stream the video data to the moving object 402 to be displayed in the interior 560. For example, the capture device 102c of the ego vehicle 50 may capture the rear view (e.g., from a back-up camera) of the moving vehicle 402, the processors 106a-106n may generate the video data from the capture device 102c, and communicate the video stream to the moving object 402 for display on one of the displays 118a-118n. The response video output 574 may enable streaming video to another car to provide an alternate video perspective for the other driver as the other driver is parking. The processors 106a-106n may generate a stream of the video that the cameras 102a-102n see to the infotainment screen of the moving object 402 to provide better visibility.

Figure 10:
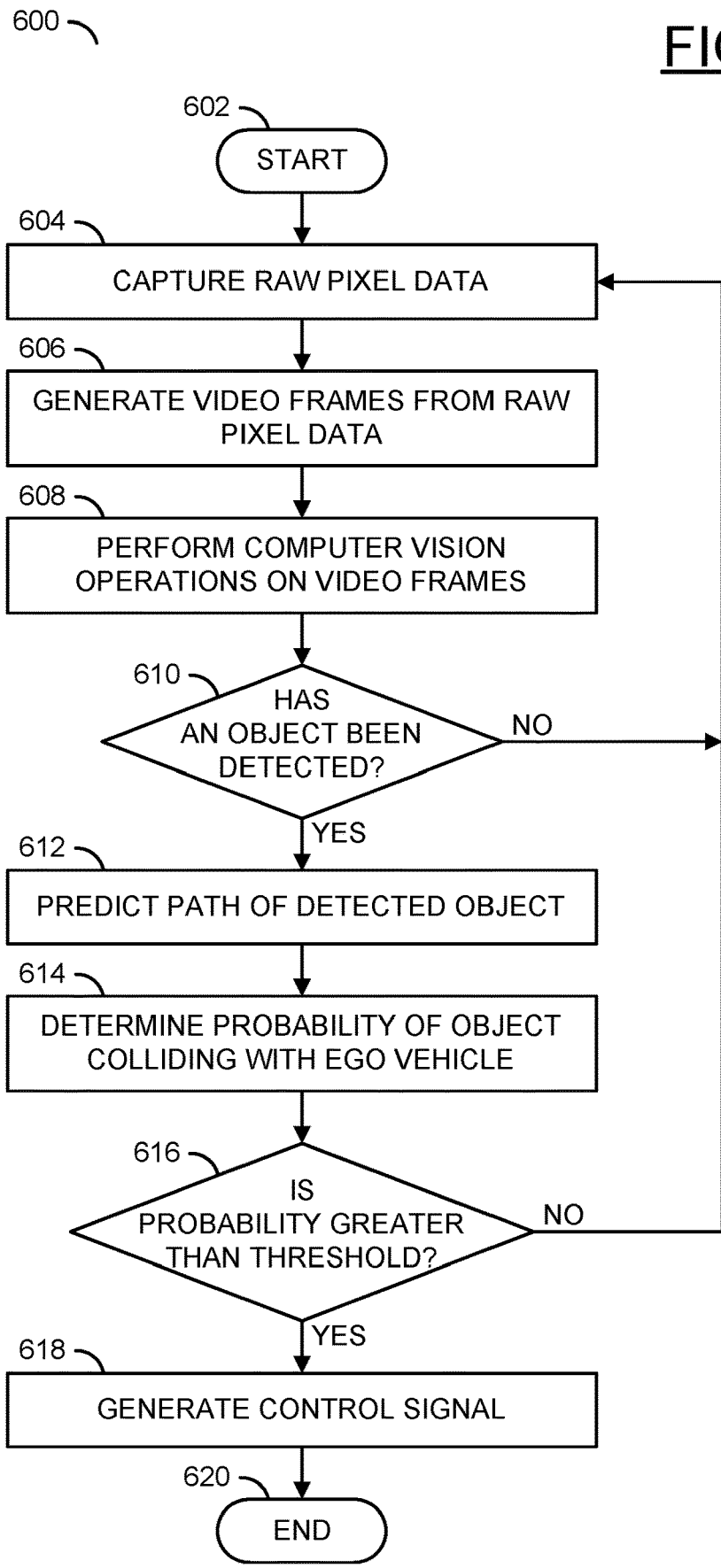
FIG. 10 is a flow diagram illustrating a method for automatic collision detection and avoidance in a stationary vehicle.

Referring to FIG. 10, a method (or process) 600 is shown. The method 600 may perform automatic collision detection and avoidance in a stationary vehicle. The method 600 generally comprises a step (or state) 602, a step (or state) 604, a step (or state) 606, a step (or state) 608, a decision step (or state) 610, a step (or state) 612, a step (or state) 614, a decision step (or state) 616, a step (or state) 618, and a step (or state) 620.

The step 602 may start the method 600. In the step 604, the capture devices 102a-102n may capture raw pixel data. In one example, the raw pixel data may be the signals FRAMES_A-FRAMES_N. In another example, the capture devices 102a-102n may capture the raw pixel data and generate the video frames FRAMES_A-FRAMES_N from the raw pixel data. Next, in the step 606, the processors 106a-106n may generate the video frames from the raw pixel data. In an example, the processors 106a-106n may receive the raw pixel data (e.g., at an input buffer), and the video pipeline 156 may generate the video frames from the raw pixel data (e.g., the video frames may be generated and operated on internal to the processors 106a-106n). In the step 608, the processors 106a-106n may perform the computer vision operations on the video frames. The computer vision operations may be performed by the CNN module 150. The computer vision operations may be configured to detect objects (e.g., a moving object such as the vehicle 402 and/or a stationary object such as the vehicles 260a-260c). Next, the method 600 may move to the decision step 610.

In the decision step 610, the processors 106a-106n may determine whether an object has been detected. In an example, the decision module 158 may detect objects such as people, bicycles, vehicles, animals, baby strollers, etc. If no object has been detected, then the method 600 may return to the step 604. If one or more objects have been detected, then the method 600 may move to the step 612.

In the step 612, the decision module 158 may determine the predicted path 404a-404c of the detected moving object 402. In an example, the CNN module 150 may detect the position, orientation and/or movement over time by performing the computer vision operations over a sequence of the video frames. Furthermore, the sensors 114a-114d configured as proximity sensors (e.g., radar, lidar, etc.) may further provide information about the relative position of the moving object 402 with respect to the ego vehicle 50. Next, in the step 614, the decision module 158 may determine a probability of the moving object 402 colliding with the ego vehicle 50. In an example, the probability may be determined based on the speed of the moving object 402, how much room the moving object 402 has to alter the trajectory, the location of the ego vehicle 50, etc. Next, the method 600 may move to the decision step 616.

In the decision step 616, the processors 106a-106n may determine whether the probability of the collision with the moving object 402 is greater than a pre-determined threshold. The pre-determined threshold may represent a confidence level of the predicted path 402. The amount of the confidence level (e.g., 99% certainty, 90% certainty, etc.) that the processors 106a-106n should reach before reacting to the moving object 402 may be a user-defined (or manufacturer defined, or defined by regulations) threshold setting. If the probability of the collision is not greater than the threshold, then the method 600 may return to the step 604 (e.g., perform no action but continue monitoring for moving objects). If the probability is greater than the threshold, then the method 600 may move to the step 618. In the step 618, the processors 106a-106n may generate the control signal VCTRL. In an example, the signal VCTRL may be presented to one or more of the actuators 116. For example, the actuators 116 may be an external speaker that outputs an audible warning for the driver of the vehicle 402. In another example, the actuators 116 may comprise multiple components of the ego vehicle 50 that may be used to autonomously move the ego vehicle 50. Next, the method 600 may move to the step 620. The step 620 may end the method 600.

Generally, when the ego vehicle 50 is parked, the battery 120 may enable accessory functions (e.g., such as the computer vision analysis) to continue to operate (or operate in a lower-powered state). The method 600 is shown with the assumption that the ego vehicle 50 is stationary and that there is sufficient power available (e.g., available charge) in the battery 120. For example, checking for sufficient available capacity in the battery 120 may be a pre-requisite for initiating the method 600. The accessory functions, including the method 600 may be disabled to preserve power, when the remaining supply in the battery 120 is below a pre-defined power threshold (e.g., less than 20% battery power left).

Figure 11:
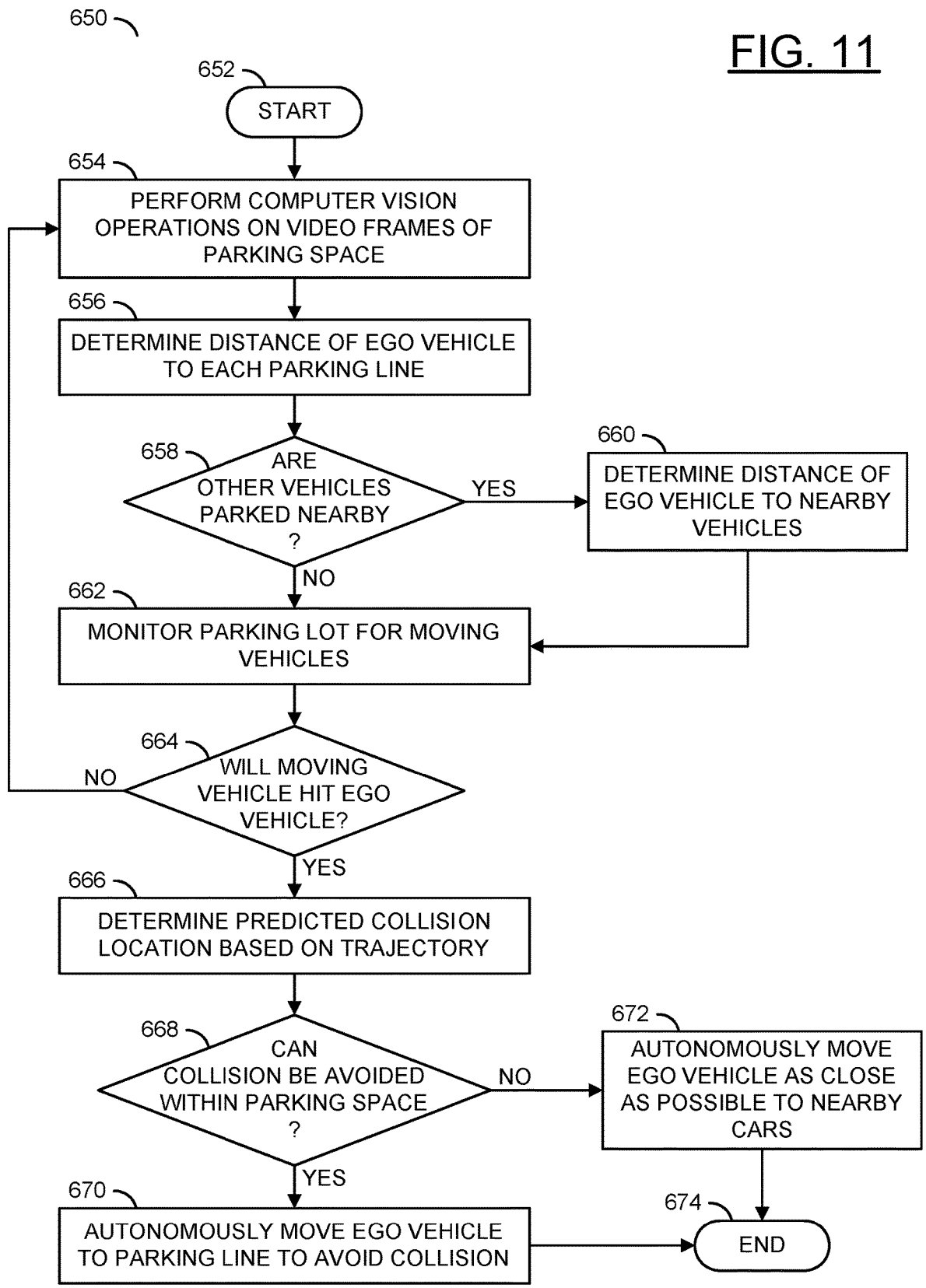
FIG. 11 is a flow diagram illustrating a method for moving a vehicle in response to a potential collision.

Referring to FIG. 11, a method (or process) 650 is shown. The method 650 may move a vehicle in response to a potential collision. The method 650 generally comprises a step (or state) 652, a step (or state) 654, a step (or state) 656, a decision step (or state) 658, a step (or state) 660, a step (or state) 662, a decision step (or state) 664, a step (or state) 666, a decision step (or state) 668, a step (or state) 670, a step (or state) 672, and a step (or state) 674.

The step 652 may start the method 650. In the step 654, the processors 106a-106n may perform the computer vision operations on the video frames (or portions of video frames) that capture the parking space 256 occupied by the ego vehicle 50. In the step 656, the processors 106a-106n may determine a distance of the ego vehicle 50 to each line of the parking space 256. The processors 106a-106n may measure the distance DPL to the parking line 254*a* to the left of the ego vehicle 50, the distance DPF to the parking line 254*b* to the front of the ego vehicle 50 and/or the distance DPR to the parking line 254*c* to the right of the ego vehicle 50. In an example, the processors 106*a*-106*n* may perform multiple measurements (e.g., the distance to the parking lines 254*a*-254*c* may vary if the ego vehicle 50 is parked at an angle). Next, the method 650 may move to the decision step 658.

In the decision step 658, the processors 106*a*-106*n* may determine whether there are other vehicles near the ego vehicle 50. For example, the CNN module 150 may detect the presence of one or more of the vehicles 260*a*-260*c* that may be located in adjacent parking spaces. If there are other vehicles nearby, then the method 650 may move to the step 660. In the step 660, the processors 106*a*-106*n* may determine a distance of the ego vehicle 50 to each line of the adjacent vehicles 260*a*-260*c*. The processors 106*a*-106*n* may measure the distance DCL to the vehicle 260*b* to the left of the ego vehicle 50, the distance DCF to the vehicle 260*a* to the front of the ego vehicle 50 and/or the distance DCR to the vehicle 260*c* to the right of the ego vehicle 50. In an example, the processors 106*a*-106*n* may perform multiple measurements (e.g., the distance to the vehicles 260*a*-260*c* may vary if the ego vehicle 50 or any of the vehicles 260*a*-260*c* are parked at an angle). Next, the method 650 may move to the step 662.

In the decision step 658, if there are no other vehicles nearby, then the method 650 may move to the step 662. In the step 662, the processors 106*a*-106*n* may monitor the captured video frames of the parking lot for moving vehicles. Next, the method 650 may move to the decision step 664.

In the decision step 664, the decision module 158 may determine whether the moving vehicle 402 may hit the ego vehicle 50. For example, the processors 106*a*-106*n* may determine whether the moving vehicle 402 may hit the ego vehicle 50 based on the predicted path 404*a*-404*c*. If the moving object 402 is determined to not be likely to hit the ego vehicle 50, then the method 650 may return to the step 654. If the moving object 402 is determined to be likely to hit the ego vehicle 50, then the method 650 may move to the step 666.

In the step 666, the processors 106*a*-106*n* may determine the location of the predicted collision based on the determined trajectory (e.g., the predicted path 404*a*-404*c*). The location of the predicted collision may indicate where the ego vehicle 50 will be hit (e.g., the rear left corner, straight from behind, the front right corner, the side door, etc.). Next, the method 650 may move to the decision step 668.

In the decision step 668, the decision module 158 may determine whether the collision may be avoided by limiting the movement of the ego vehicle 50 to within the bounds of the parking space 256. If the collision may be avoided within the bounds of the parking space 256, then the method 650 may move to the step 670. In the step 670, the processors 106*a*-106*n* may generate the control signal VCTRL to cause the actuators 116 to autonomously move the ego vehicle 50 within the parking lines 254*a*-254*c*. For example, the ego vehicle 50 may be moved a maximum distance based on the measured distances DPL, DFL and/or DRL. Next, the method 650 may move to the step 674.

In the decision step 668, if the collision cannot be avoided by remaining in the bounds of the parking space 256, then the method 650 may move to the step 672. In the step 672, the processors 106*a*-106*n* may generate the control signal VCTRL to cause the actuators 116 to move the ego vehicle 50 farther than the parking lines 254*a*-254*c*. For example, the ego vehicle 50 may be autonomously moved beyond the parking lines 254*a*-254*c* but not enough to hit the adjacent parked vehicles 260*a*-260*c*. For example, the ego vehicle 50 may be moved a distance DCL, DCF and/or DCR to avoid the collision with the ego vehicle 50. In the example scenario where the distances DCL, DCF and/or DCR are not large enough to avoid the collision, the ego vehicle 50 may still move as far as the distances DCL, DCF and/or DCR to mitigate the amount of impact received from the ego vehicle 50. Next, the method 650 may move to the step 674. The step 674 may end the method 650.

Figure 12:
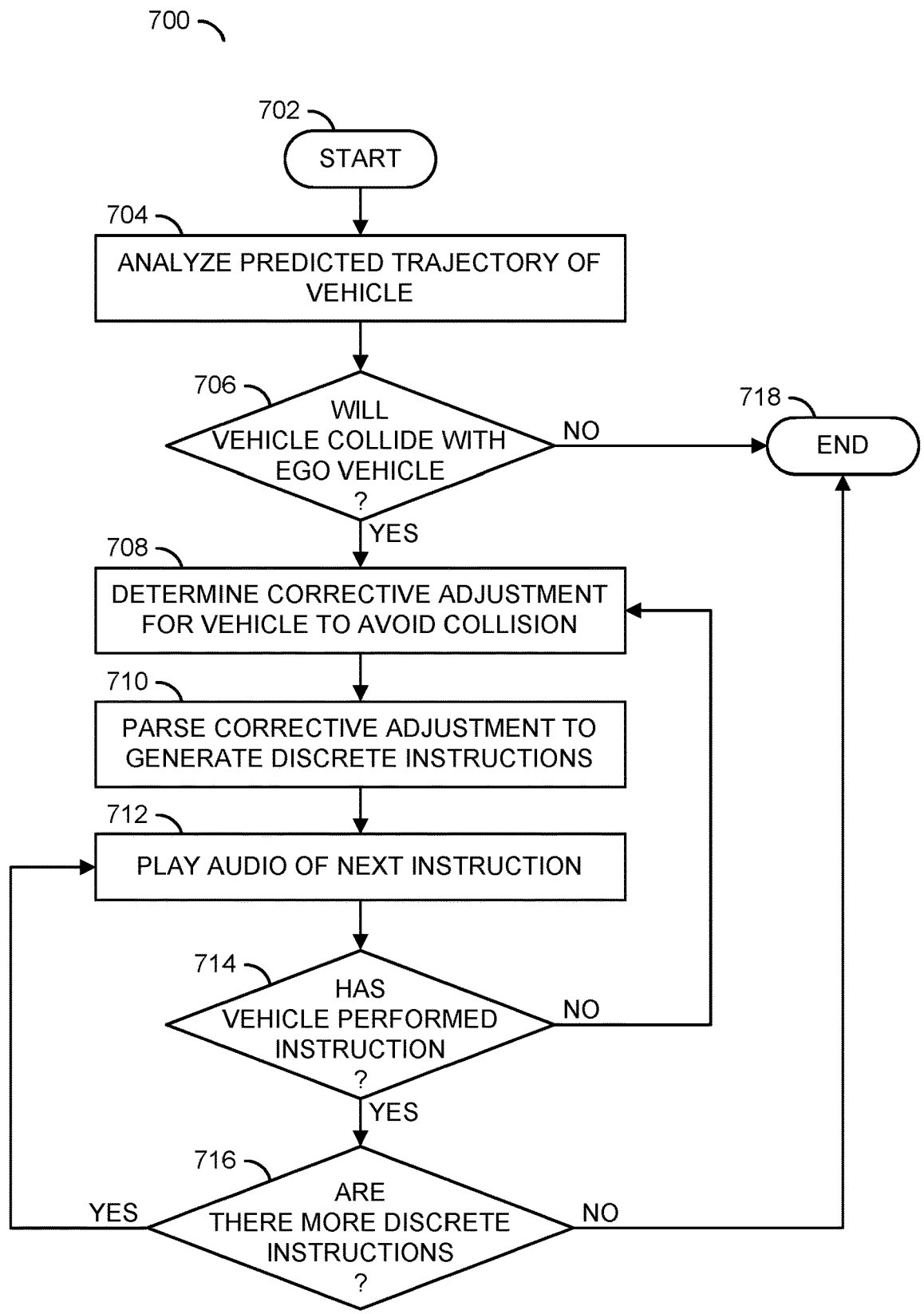
FIG. 12 is a flow diagram illustrating a method for providing discrete instructions to a moving object.

Referring to FIG. 12, a method (or process) 700 is shown. The method 700 may provide discrete instructions to a moving object. The method 700 generally comprises a step (or state) 702, a step (or state) 704, a decision step (or state) 706, a step (or state) 708, a step (or state) 710, a step (or state) 712, a decision step (or state) 714, a decision step (or state) 716, and a step (or state) 718.

The step 702 may start the method 700. In the step 704, the processors 106*a*-106*n* may analyze the predicted trajectory 404*a*-404*c* of the vehicle 402. Next, the method 700 may move to the decision step 706.

In the decision step 706, the processors 106*a*-106*n* may determine whether the moving vehicle 402 may collide with the ego vehicle 50. If the moving vehicle 50 may not collide with the ego vehicle 50, the method 700 may move to the step 718. If the moving vehicle 50 may collide with the ego vehicle 50, then the method 700 may move to the step 708.

In the step 708, the processors 106*a*-106*n* may determine a corrective adjustment for the moving vehicle 50 to avoid the collision with the ego vehicle 50. The corrective adjustment may comprise an amount and/or type of movement of the moving vehicle 50 to change the predicted path 404*a*-404*c* enough to not hit the ego vehicle 50. The corrective adjustment may be determined by the decision module 158, based on the speed of the moving vehicle 402, the orientation of the moving vehicle 402, the amount of space remaining between the moving vehicle 402 and the ego vehicle 50, etc.

Next, in the step 710, the processors 106*a*-106*n* may parse the corrective adjustment (e.g., course correction) to generate the discrete instructions. Parsing the corrective adjustment may comprise analyzing how the moving vehicle 402 would have to move to avoid the collision and breaking down the movement into individual steps that may be performed by a driver. The individual steps may be converted to instructions in a particular language. Audio may be generated from the individual steps for playback as the discrete instructions. In the step 712, the external speaker 116 may play a next one of the discrete instructions. For example, the first instruction may be the audio output 410 providing the audio instruction to 'STOP'. Next, the method 700 may move to the decision step 714.

In the decision step 714, the decision module 158 may determine whether the moving vehicle 402 has performed the discrete instruction. The processors 106*a*-106*n* may continue to perform the computer vision analysis of the moving object 402, detect changes to the predicted path 404*a*-404*c* and/or monitor the sensors 114. In an example, if the audio output 410 provided the instruction to 'STOP', then the processors 106*a*-106*n* may determine whether or not the moving vehicle 402 has stopped. In another example, even if the audio instruction 410 was to stop, if the predicted path 404*a*-404*c* has changed enough to avoid the collision (e.g., the driver of the vehicle 402 did not stop, but performed another action that prevented the collision), the processors 106*a*-106*n* may determine that the discrete instructions were performed. If the discrete instruction was not performed, the method 700 may return to the step 708. For example, the processors 106a-106n may re-analyze the scenario and may come up with new instructions (or repeat the same instructions again if still applicable). If the vehicle 402 has performed the discrete instruction, then the method 700 may move to the decision step 716.

In the decision step 716, the processors 106a-106n may determine whether there are more discrete instructions to provide. If there are more discrete instructions, then the method 700 may return to the step 712. If there are not more discrete instructions to provide, then the method 700 may move to the step 718. The step 718 may end the method 700.

Figure 13:
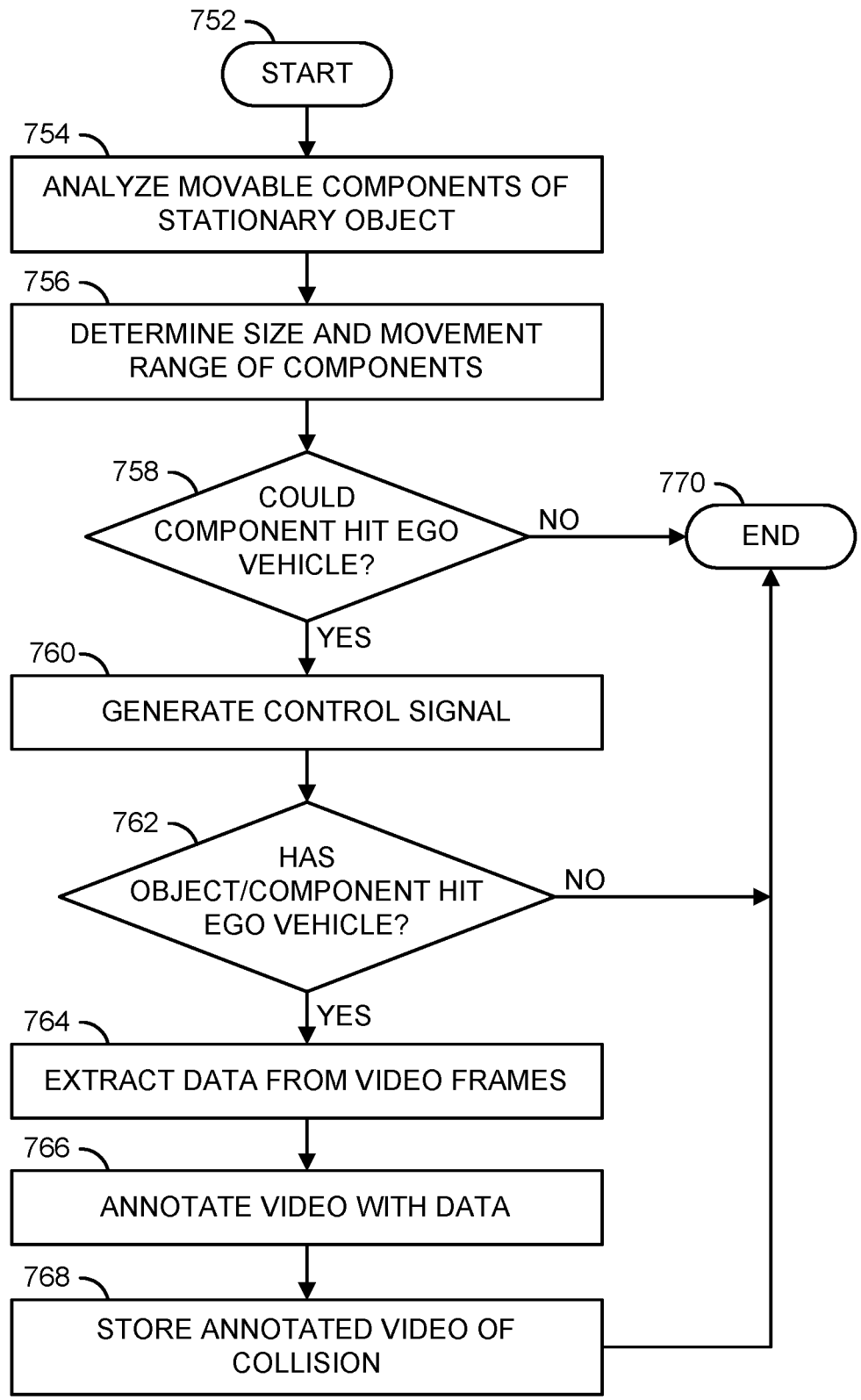
FIG. 13 is a flow diagram illustrating a method for providing annotated videos in response to an event.

Referring to FIG. 13, a method (or process) 750 is shown. The method 750 may provide annotated videos in response to an event. The method 750 generally comprises a step (or state) 752, a step (or state) 754, a step (or state) 756, a decision step (or state) 758, a step (or state) 760, a decision step (or state) 762, a step (or state) 764, a step (or state) 766, a step (or state) 768, and a step (or state) 770.

The step 752 may start the method 750. In the step 754, the processors 106a-106n may analyze movable components of a stationary object. For example, the CNN module 150 may detect the car door 452 of the parked vehicle 260c. In another example, the CNN module 150 may detect objects that could potentially move (e.g., shopping carts). Next, in the step 756, the processors 106a-106n may determine a size and/or movement range of the components. For example, the processors 106a-106n may measure the length LD of the car door 452. In another example, the processors 106a-106n may determine the swing range 454 of the car door 452. Next, the method 750 may move to the decision step 758.

In the decision step 758, the decision module 158 may determine whether the component could potentially hit the ego vehicle 50. For example, the processors 106a-106n may determine whether the open position 456 of the car door 452 would be in contact with the ego vehicle 50. If the movable component could not possibly hit the ego vehicle 50, then the method 750 may move to the step 770. If the movable component could hit the ego vehicle 50, then the method 750 may move to the step 760. In the step 760 the processors 106a-106n may generate the control signal VCTRL. In one example, the signal VCTRL may enable the audio output 410 that may be a warning to the driver of the parked vehicle 260c (e.g., 'Be careful when opening the door, you are parked too close). In another example, the signal VCTRL may cause the ego vehicle 50 to autonomously move to another parking spot or re-adjust a position within the same parking spot to move farther away from the car door 452. Next, the method 750 may move to the decision step 762.

In the decision step 762, the processors 106a-106n may determine whether the movable object 402 and/or the movable component 452 has hit the ego vehicle 50. In one example, the computer vision analysis may be used to determine whether there was contact with the ego vehicle 50. In another example, one or more of the sensors 114 may be configured to detect an impact with the ego vehicle 50. If no objects have hit the ego vehicle 50, then the method 750 may move to the step 770. If an object has hit the ego vehicle 50, then the method 750 may move to the step 764.

In the step 764, the processors 106a-106n may extract video data from the video frame. For example, the processors 106a-106n may detect and extract data about the face of the person 482 that caused the damage, the color of the object, the make/model of the vehicle that caused the contact, the time that the contact occurred, etc. Next, in the step 766, the processors 106a-106n may add the annotations 494 to the video frame(s). In the step 768, the processors 106a-106n may store the annotated video frame(s) in the memory 108. Next, the method 750 may move to the step 770. The step 770 may end the method 750.

Figure 14:
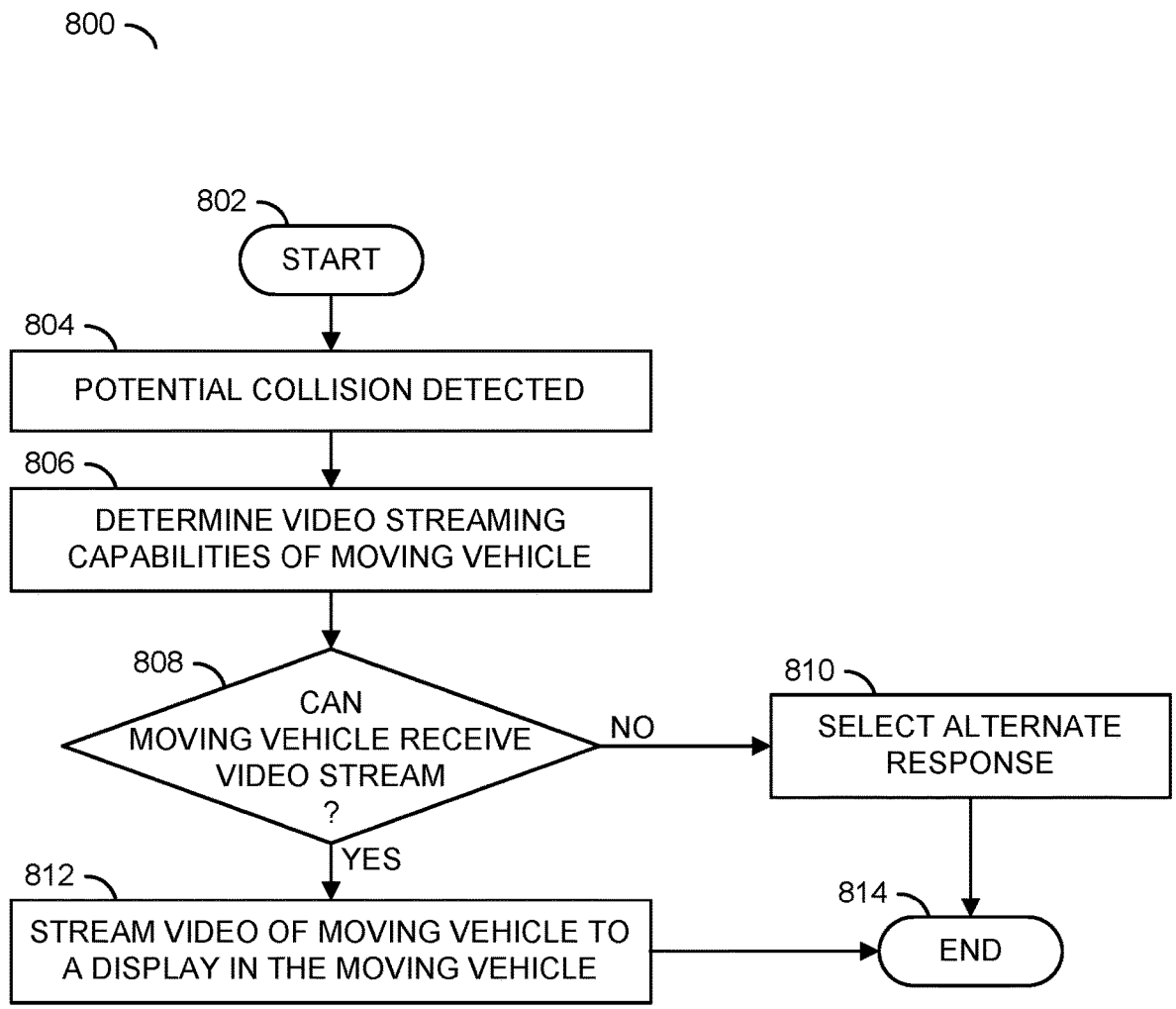
FIG. 14 is a flow diagram illustrating a method for streaming video to another vehicle.

Referring to FIG. 14, a method (or process) 800 is shown. The method 800 may stream video to another vehicle. The method 800 generally comprises a step (or state) 802, a step (or state) 804, a step (or state) 806, a decision step (or state) 808, a step (or state) 810, a step (or state) 812, and a step (or state) 814.

The step 802 may start the method 800. In the step 804, the processors 106a-106n may detect a potential collision with the moving vehicle 402 (e.g., by determining the predicted path 404a-404c). Next, in the step 806, the processors 106a-106n may determine video streaming capabilities of the moving vehicle 402. For example, the communication devices 110 may query a communication device implemented by the moving vehicle 402 to request capabilities of the moving vehicle 402 (e.g., whether the moving vehicle 402 also implements the apparatus 100, whether the moving vehicle 402 implements the displays 118a-118n, whether the moving vehicle 402 is able to receive video streams, whether the moving vehicle 402 implements security protocols for securely receiving data from other vehicles, etc.). Next, the method 800 may move to the decision step 808.

In the decision step 808, the processors 106a-106n may determine whether the moving vehicle 402 is capable of receiving one or more of the video streams VOUT_A-VOUT_N. For example, the response to the query may provide the capabilities of the moving vehicle 402 that the processors 106a-106n may analyze. In another example, the response to the query may be an authentication key for providing the video stream. In yet another example, the response to the query may be a refusal to connect. If the moving vehicle 402 is not capable of receiving the video streams, then the method 800 may move to the step 810. In the step 810, the processors 106a-106n may select an alternate response (e.g., generating the audio output 410, autonomously moving the ego vehicle 50, etc.). Next, the method 800 may move to the step 814.

In the decision step 808, if the moving vehicle 402 is capable of receiving the video stream, then the method 800 may move to the step 812. In the step 812, the processors 106a-106n may generate the video stream and the communication devices 110 may provide the wireless communication 570. The wireless communication 570 may provide the video stream to a display implemented by the moving vehicle 402. Next, the method 800 may move to the step 814. The step 814 may end the method 800.

Generally, the processors 106a-106n may perform the responses to the moving vehicle 402 when the ego vehicle 50 is stationary. For example, the ego vehicle 50 may be stationary when the driver 202 is not in the ego vehicle 50 (e.g., the ego vehicle 50 is parked). In another example, the ego vehicle 50 may be stationary when the driver 202 is present but the ego vehicle 50 is not moving (e.g., the driver 202 is waiting at a stop light, the driver 202 is waiting at a drive-through, etc.). The battery 120 may enable the apparatus 100 to operate when the ego vehicle 50 is not powered on.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer)

processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a capture device configured to generate pixel data corresponding to an exterior view from a vehicle; and
    a processor configured to (i) process said pixel data arranged as video frames, (ii) perform computer vision operations on said video frames to detect a moving object in said video frames, (iii) determine a predicted path of said moving object, (iv) determine a probability of said moving object colliding with said vehicle based on said predicted path, (v) determine whether said vehicle is stationary, (vi) perform said computer vision operations on said video frames to measure distances to lines of a parking space occupied by said vehicle and (vii) generate a control signal if (a) said vehicle is stationary and (b) said probability is greater than a pre-determined threshold, wherein
        (i) said control signal is configured to enable an autonomous movement of said vehicle in order to move said vehicle to avoid said predicted path of said moving object,
        (ii) said predicted path is determined by tracking said moving object over time in a sequence of video frames,
        (iii) said autonomous movement comprises a low speed avoidance maneuver within said distances measured,
        (iv) said distances measured define a bounds of said parking space, and
        (v) said autonomous movement comprises moving said vehicle to avoid said predicted path of said moving object while staying within said bounds of said parking space.

2. The apparatus according to claim 1, wherein said vehicle is parked in a parking lot.

3. The apparatus according to claim 1, wherein said control signal is further configured to provide a response that enables honking a horn of said vehicle.

4. The apparatus according to claim 1, wherein said control signal is further configured to provide a response that enables a verbal instruction.

5. The apparatus according to claim 4, wherein (i) said processor is further configured to (a) determine a course correction to prevent said moving object from colliding with said vehicle and (b) provide discrete steps to perform said course correction and (ii) said verbal instruction comprises said discrete steps of said course correction.

6. The apparatus according to claim 1, wherein said processor is further configured to (i) read an available charge of a battery of said vehicle and (b) disable performing said computer vision operations on said video frames when said available charge is below a pre-determined threshold.

7. The apparatus according to claim 6, wherein (i) said vehicle is an electric vehicle and (ii) said battery supplies power for said electric vehicle.

8. The apparatus according to claim 1, wherein said vehicle is parked in said parking space and does not have a driver.

9. The apparatus according to claim 1, wherein (A) said control signal is further configured to provide a response and (B) said processor is further configured to (i) continue performing said computer vision operations on said video frames after said control signal is generated to determine a result of said response, (ii) said result comprises whether said moving object (a) collided with said vehicle or (b) would have collided with said vehicle if said response was not performed and (iii) compare said result with said probability to determine an accuracy of said probability based on said computer vision operations.

10. The apparatus according to claim 9, further configured to upload said accuracy of said probability and said video frames used to determine said probability to a remote device, wherein said video frames are used by said remote device for training said computer vision operations.

11. The apparatus according to claim 1, wherein (i) said processor is further configured to (a) record a subset of said video frames and (b) add annotations to said subset of said video frames, (ii) said subset of said video frames comprise said video frames that were used to determine said probability, (iii) said annotations comprise information about said moving object and (iv) said apparatus is further configured to communicate said subset of said video frames to an owner of said vehicle.

12. The apparatus according to claim 1, wherein (i) said computer vision operations performed by said processor are further configured to detect stationary objects that comprise a component that is capable of movement and (ii) said processor is further configured to determine a potential event based on said computer vision operations performed on said stationary objects.

13. The apparatus according to claim 12, wherein (i) one of said component that is capable of movement of said stationary objects is a car door, (ii) said processor is further configured to determine a potential trajectory of said car door and (iii) said potential event is damage to said vehicle from said car door based on said potential trajectory.

14. The apparatus according to claim 13, wherein (i) said processor is further configured to generate said control signal in response to said potential event and (ii) said autonomous movement is implemented for adjusting a location of said vehicle based on said potential trajectory of said component that is capable of movement of said stationary objects.

15. The apparatus according to claim 1, wherein (A) said control signal is further configured to provide a response and (B) said response comprises (i) said processor generating a video stream from said video frames and (ii) said apparatus communicating said video stream to a display implemented by said moving object.

16. The apparatus according to claim 1, wherein said vehicle is stationary when said vehicle is idling at a stop light and a driver is operating said vehicle.

17. The apparatus according to claim 1, wherein said apparatus is configured to perform automatic collision detection, warning, avoidance and prevention in parked cars.

18. The apparatus according to claim 1, wherein said processor is further configured to determine an approach angle of said moving object based on said predicted path and said autonomous movement comprises moving said vehicle in a direction based on said approach angle in order to provide more room for said moving object.

* * * * *